United States Patent
Dudar et al.

(10) Patent No.: US 9,512,791 B1
(45) Date of Patent: Dec. 6, 2016

(54) SYSTEMS AND METHODS FOR OPERATING AN EVAPORATIVE EMISSIONS SYSTEM

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/747,741

(22) Filed: Jun. 23, 2015

(51) Int. Cl.
    *F02D 41/26* (2006.01)
    *F02D 41/00* (2006.01)
    *F02M 25/08* (2006.01)

(52) U.S. Cl.
    CPC .......... *F02D 41/0032* (2013.01); *F02D 41/26* (2013.01); *F02M 25/0809* (2013.01); *F02M 25/089* (2013.01); *F02M 25/0854* (2013.01); *F02M 25/0872* (2013.01); *F02M 2025/0881* (2013.01)

(58) Field of Classification Search
    CPC ...... F02D 41/00; F02D 41/0032; F02D 41/26; F02M 25/08; F02M 25/089; F02M 25/0809; F02M 25/0872; F02M 25/0854; F02M 2025/0881

See application file for complete search history.

(56) References Cited

U.S. PATENT DOCUMENTS

| | | | |
|---|---|---|---|
| 4,732,588 A | 3/1988 | Covert et al. | |
| 5,158,054 A * | 10/1992 | Otsuka | F02M 25/0809 123/198 D |
| 6,662,572 B1 | 12/2003 | Howard | |
| 7,305,975 B2 * | 12/2007 | Reddy | F02D 41/0045 123/518 |
| 7,444,996 B2 * | 11/2008 | Potier | F02M 25/08 123/519 |
| 8,418,477 B2 | 4/2013 | Klein et al. | |
| 9,050,885 B1 | 6/2015 | Dudar et al. | |
| 2010/0094493 A1 | 4/2010 | Atsumi | |
| 2012/0260893 A1 | 10/2012 | Makino | |
| 2015/0158378 A1 | 6/2015 | Dudar et al. | |

FOREIGN PATENT DOCUMENTS

| | | |
|---|---|---|
| CN | 102975590 A | 3/2013 |
| DE | 102010006042 A1 | 8/2011 |

\* cited by examiner

*Primary Examiner* — Hieu T Vo
(74) *Attorney, Agent, or Firm* — James Dottavio; Alleman Hall McCoy Russell & Tuttle LLP

(57) ABSTRACT

Methods and systems are provided for selectively cooling a fuel vapor canister based on vehicle operating conditions, or in response to an anticipated or requested refueling event. In one example, canister cooling elements are powered by solar cells coupled to the vehicle, thereby cooling the canister during conditions wherein bleed emissions are likely to occur. In this way, canister cooling may reduce hydrocarbon vapor bleed emissions without draining the vehicle battery, and may further provide opportunities to advantageously conduct leak tests on the evaporative emissions system.

20 Claims, 9 Drawing Sheets

SYSTEMS AND METHODS FOR OPERATING AN EVAPORATIVE EMISSIONS SYSTEM

FIELD

The present description relates generally to methods and systems for operating a vehicle evaporative emissions system in order to minimize bleed emissions.

BACKGROUND/SUMMARY

Vehicle emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, engine run time in hybrid vehicles and plug-in hybrid vehicles may be limited, and thus opportunities for purging fuel vapor from the canister may also be limited. If the vehicle is refueled, saturating the canister with fuel vapor, and then parked in a hot, sunny location prior to a purge event, the canister may desorb fuel vapors as it warms up, leading to bleed emissions. For vehicles that vent the fuel tank during a vehicle-off condition, the volatilization of fuel under similar conditions may overwhelm the capacity of the fuel vapor canister.

One approach for addressing these problems is described in U.S. Pat. No. 4,732,588 to Covert et al. Therein, a thermo-electric cooler is deposed at a canister inlet and activated when the vehicle engine is turned off. However, the inventors herein have recognized potential issues with such systems. For example, the thermo-electric cooler is powered by the vehicle battery, and no conditions are indicated for selectively activating the thermo-electric cooler, or for de-activating the cooler during a lengthy vehicle-off soak. As such, the vehicle battery may be drained, even if cooling the canister is not necessary based on operating conditions. This may lead to scenarios wherein the battery does not sustain enough charge to power a subsequent engine ignition.

In one example, the issues described above may be addressed by a method for a vehicle. During a first condition, including a vehicle-off condition and a vehicle sun exposure greater than a threshold, one or more cooling elements coupled to a fuel vapor canister are activated, and one or more cooling fans are activated to dissipate heat generated by the one or more cooling elements. In this way, desorption of fuel vapors from the canister to the atmosphere may be decreased when the vehicle is parked in the sun, when bleed emissions are likely to occur in the absence of canister cooling.

As one example, the cooling elements and cooling fans may be powered by solar cells, operative to convert solar radiation incident thereon into electrical energy. In this way, bleed emissions may be reduced without compromising vehicle battery charge. Further, during conditions where bleed emissions are most likely to occur (i.e. hot and sunny days), ample energy to supply the cooling elements and cooling fans may be readily available. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
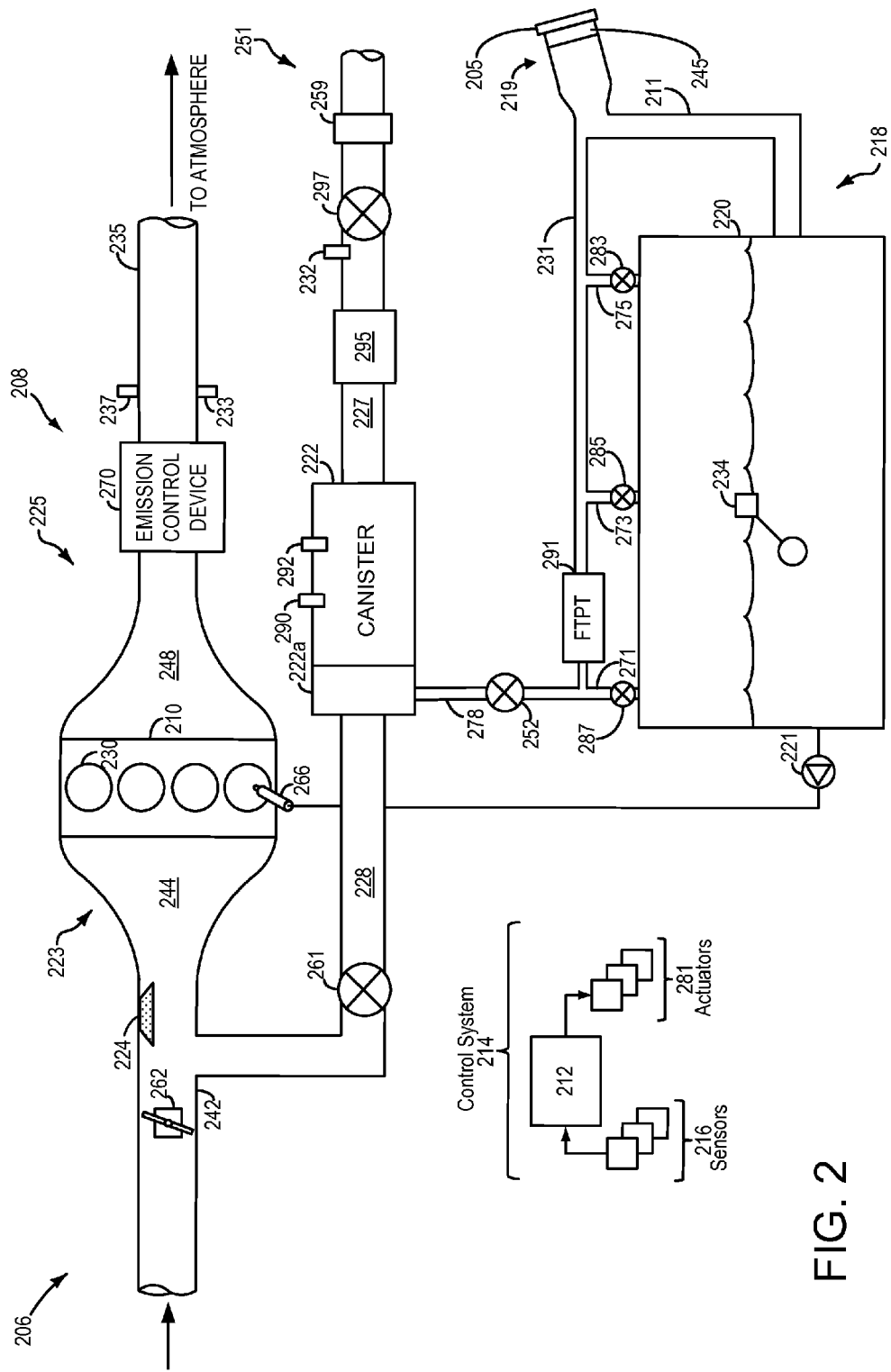
FIG. 2 shows a schematic depiction of a fuel system and evaporative emissions system coupled to an engine system.
Figure 3:
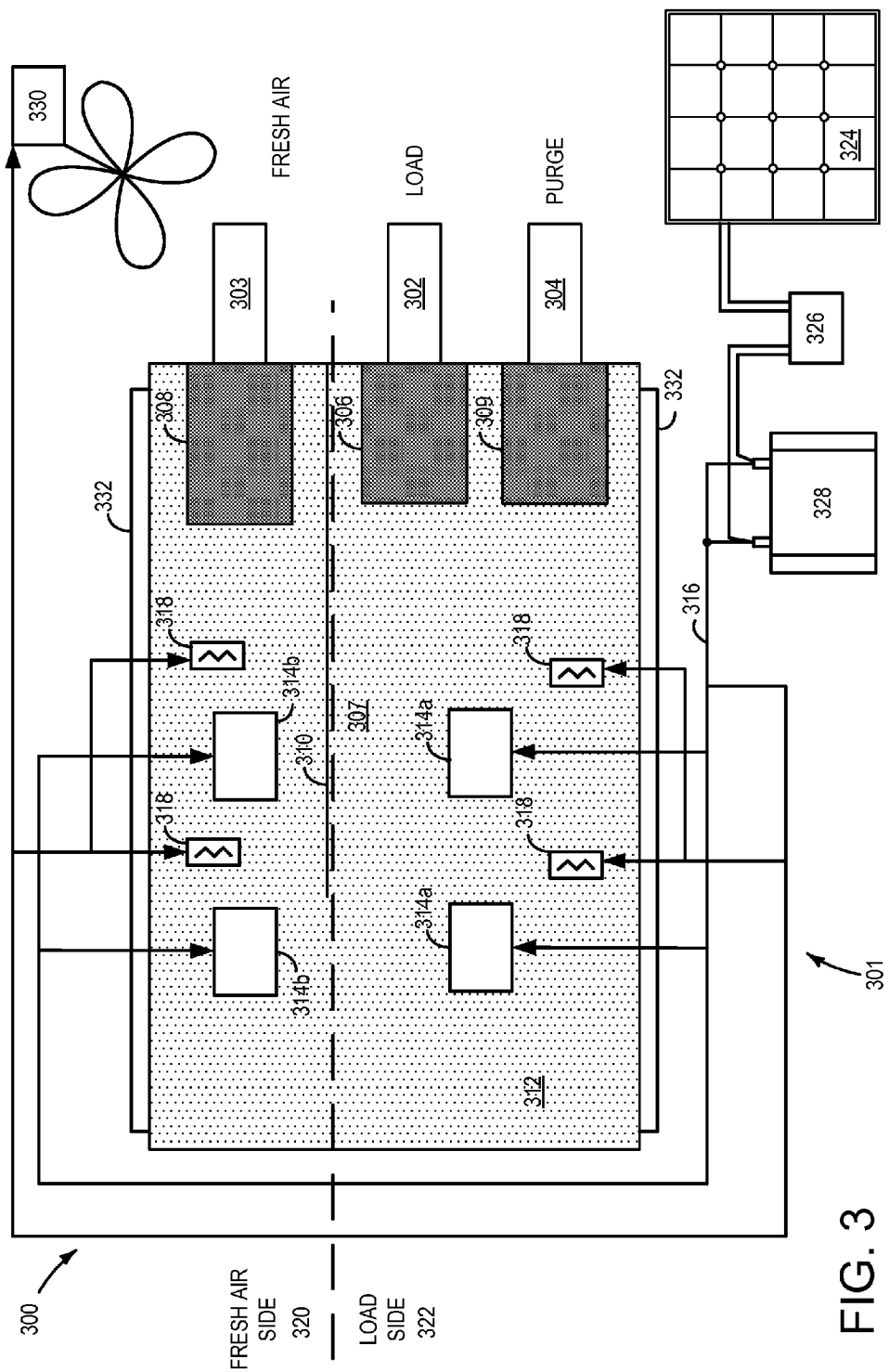
FIG. 3 shows a schematic depiction of a thermal management system for a fuel vapor canister.
Figure 4:
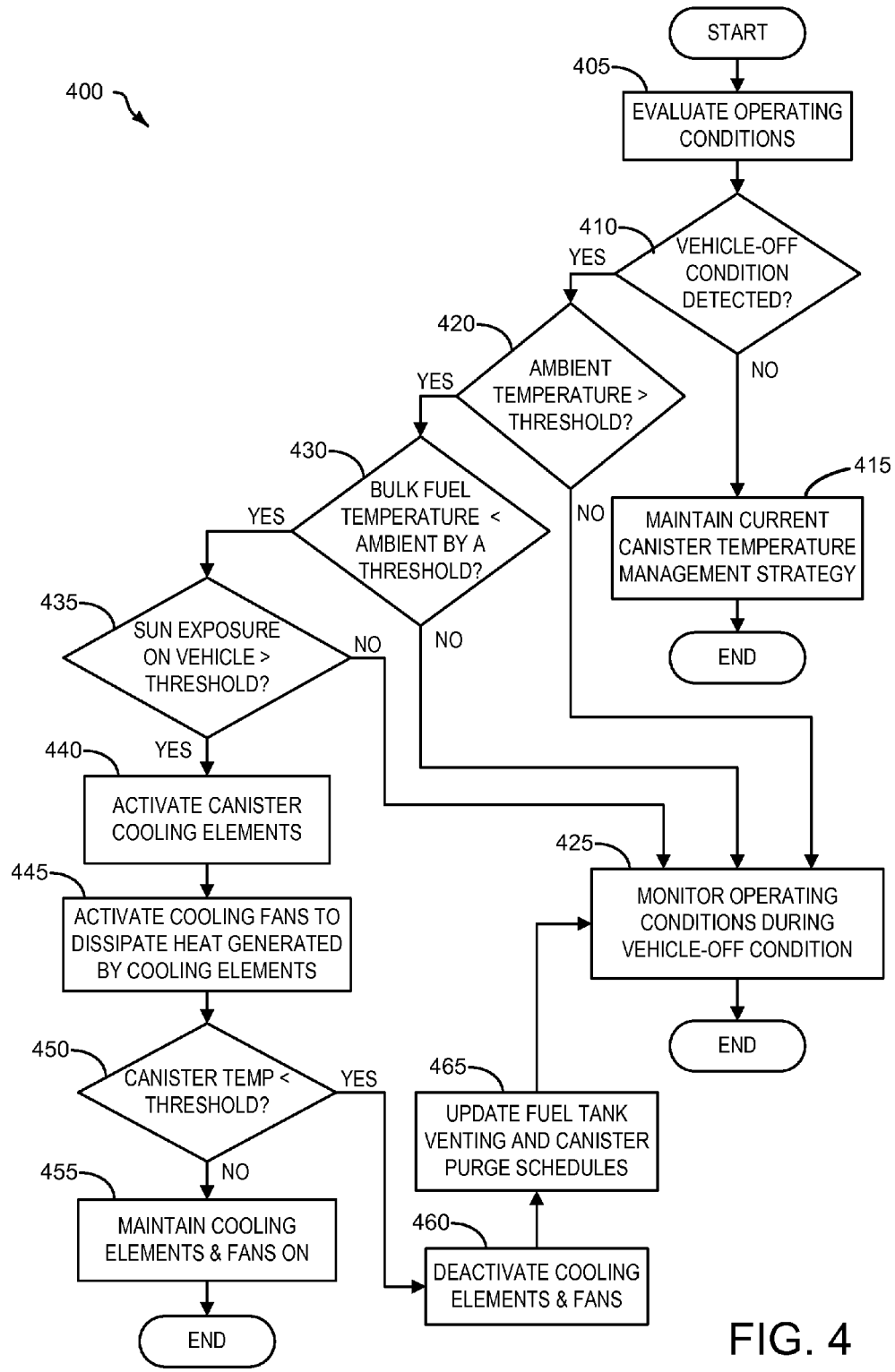
FIG. 4 shows a high-level flow chart for a method for managing bleed emissions of a fuel vapor canister during a vehicle-off condition.
Figure 5:
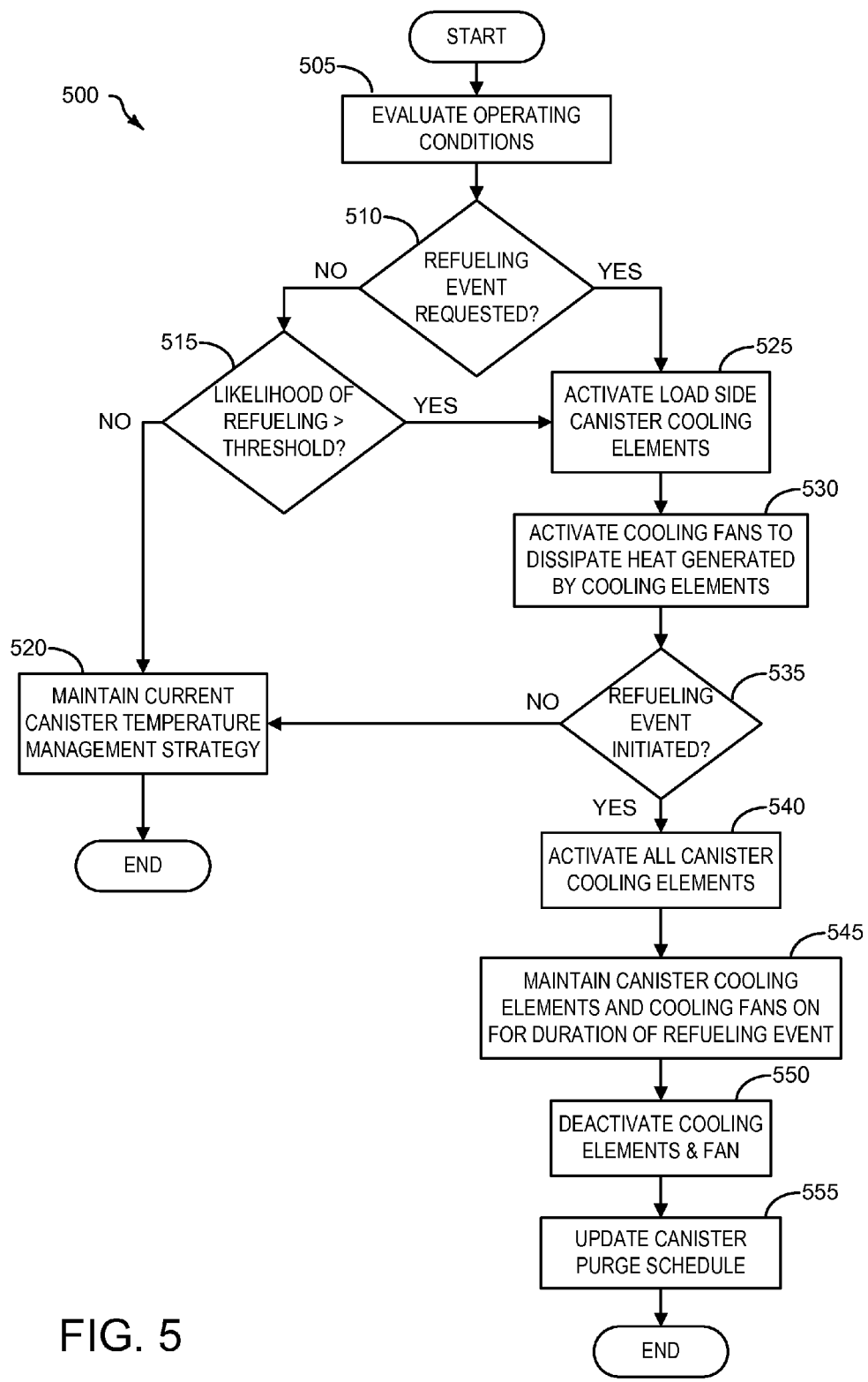
FIG. 5 shows a high-level flow chart for a method of cooling a fuel vapor canister in anticipation of a refueling event.
Figure 6:
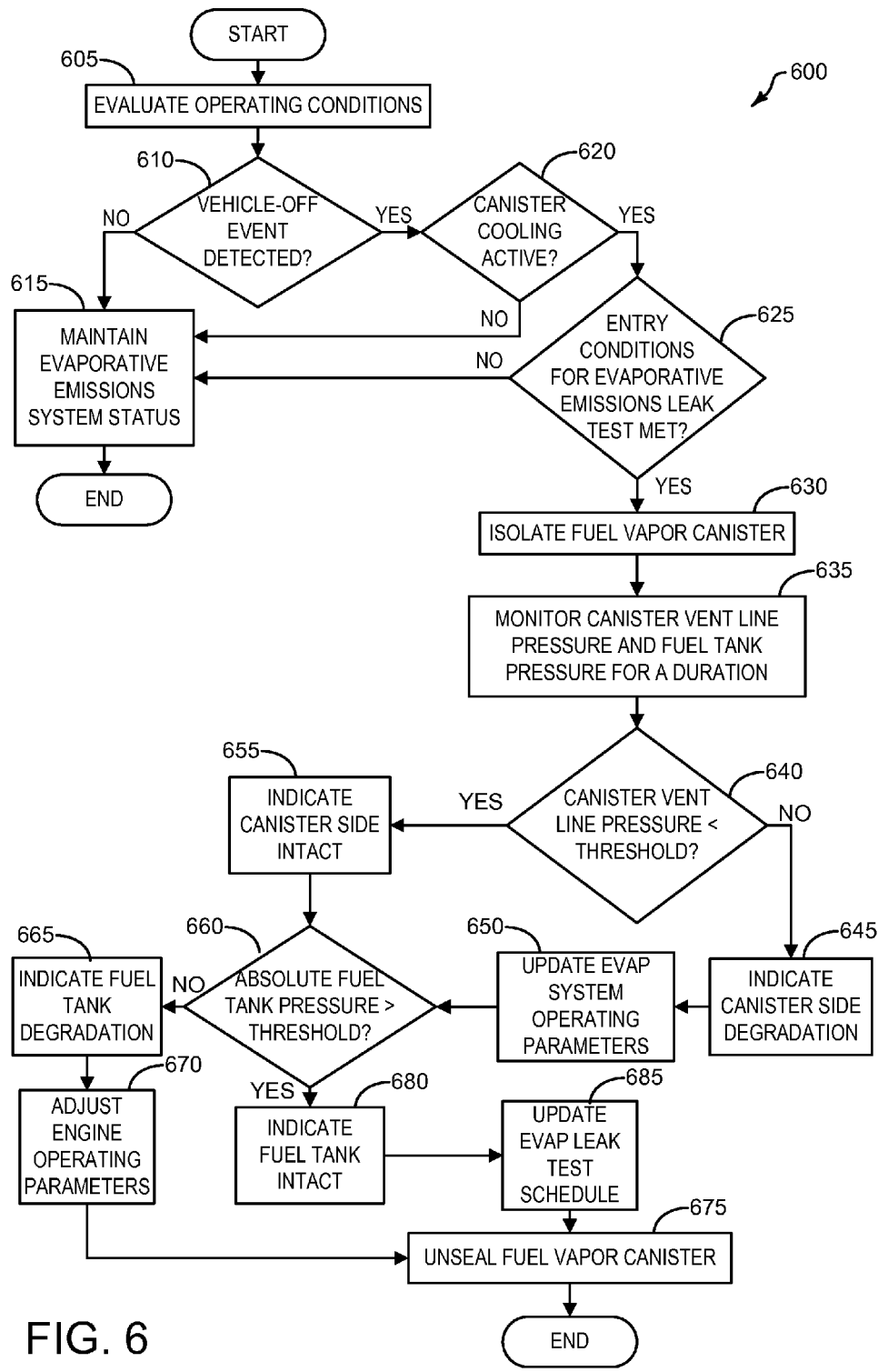
FIG. 6 shows a high-level flow chart for a method of determining the integrity of an evaporative emissions system.
Figure 7:
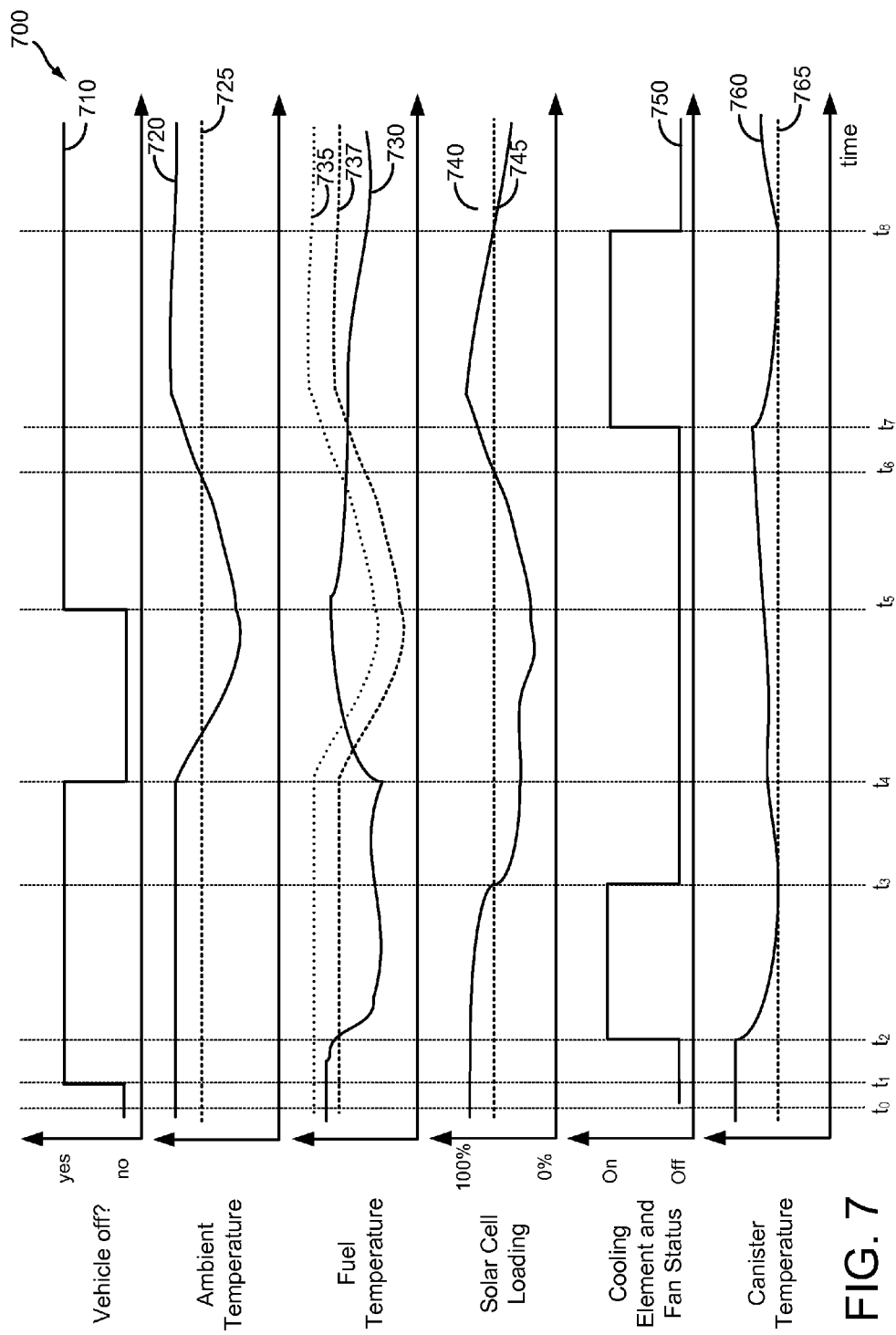
FIG. 7 shows an example timeline for managing bleed emissions of a fuel vapor canister during a vehicle-off condition.
Figure 8:
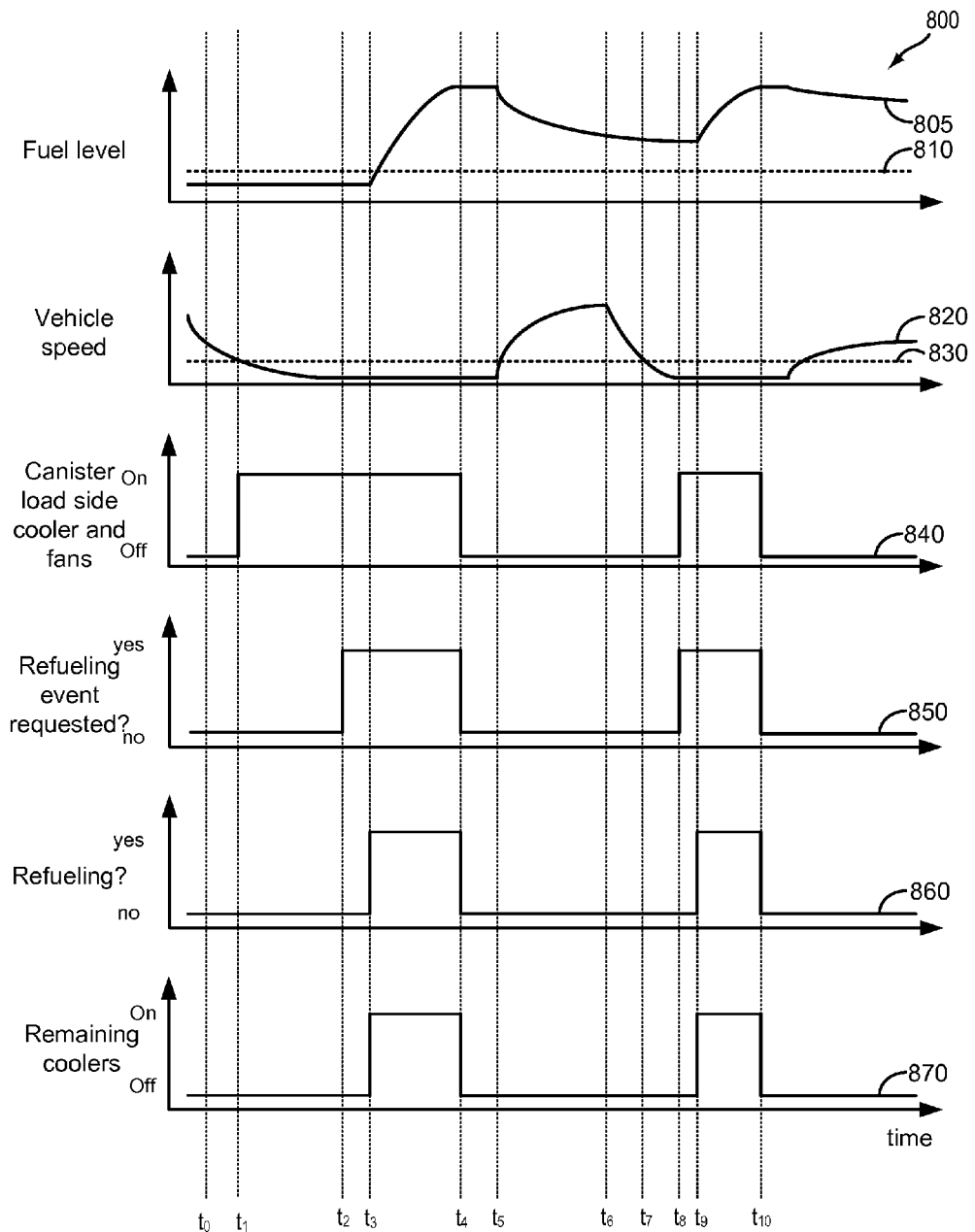
FIG. 8 shows an example timeline for cooling a fuel vapor canister in anticipation of a refueling event.
Figure 9:
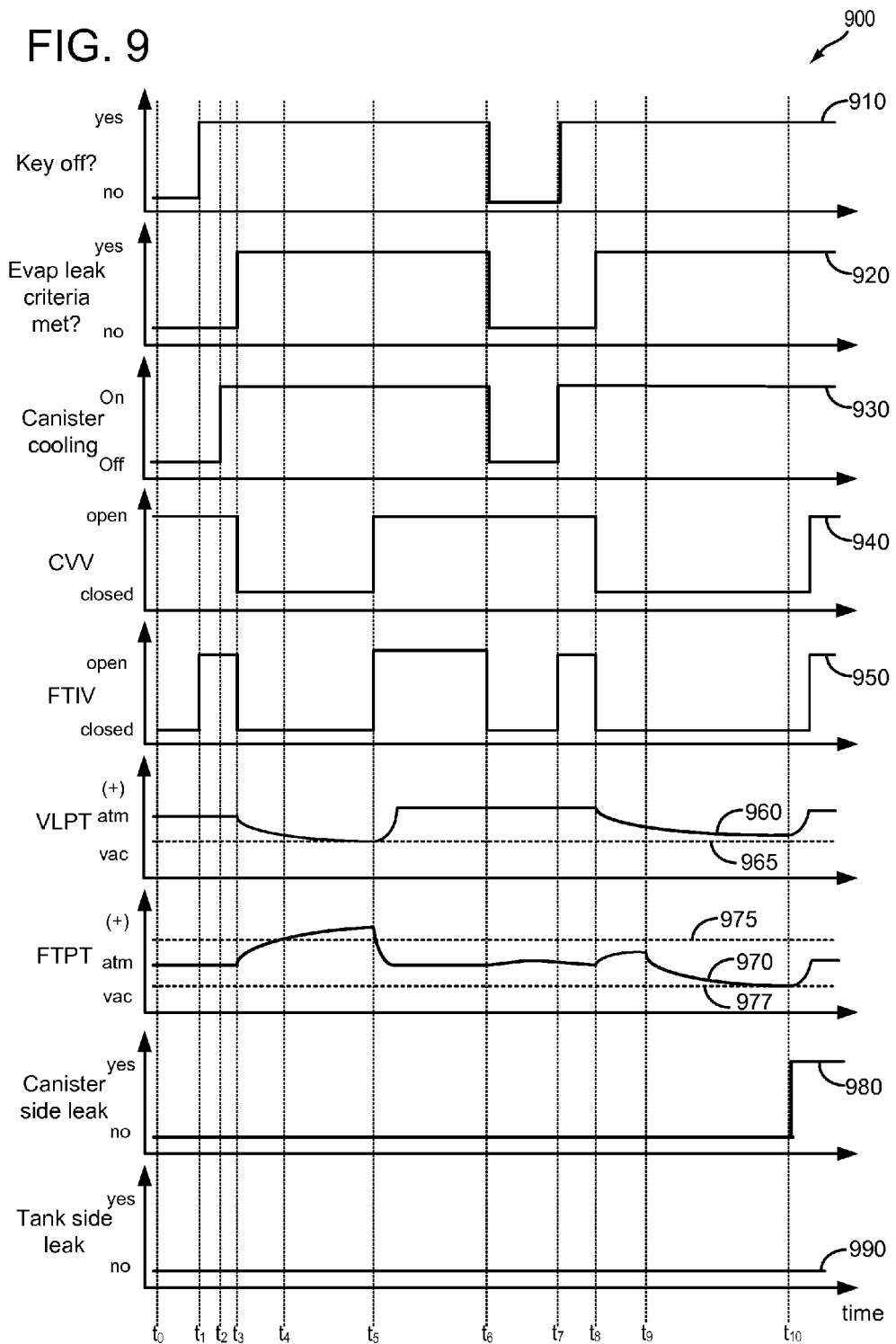
FIG. 9 shows an example timeline for an evaporative emissions system leak test.

This description relates to systems and methods for managing a fuel vapor canister temperature in order to reduce bleed emissions. More specifically, the description relates to systems and methods wherein thermo-electric cooling devices are selectively activated at, following, or prior to a vehicle-off event based on operating conditions. A cooling fan may be operated to further dissipate heat, such as the cooling fan shown as part of an engine cooling system in FIG. 1. Further, the canister may be cooled using power generated by solar cells coupled to the vehicle, as further depicted in FIG. 1. The fuel vapor canister may be comprised within an evaporative emissions system coupled to a fuel system and engine system, as shown in FIG. 2. As fuel vapor adsorption is an exothermic reaction, and fuel vapor desorption is an endothermic reaction, the fuel vapor canister may be coupled to a thermal management system, as shown in FIG. 3. Thermo-electric devices, such as Peltier elements may be utilized to heat the canister prior to purging events, and to cool the canister prior to refueling events, or during other conditions where canister saturation and/or fuel vapor desorption is likely. For example, as shown in FIGS. 4 and 7, the cooling elements may be used to cool the fuel vapor canister following a vehicle-off condition when the vehicle is parked in a warm, sunny location. The solar cells may be used to determine sun exposure, and further used to convert solar energy to power the thermo-electric coolers, thereby cooling the canister without draining the vehicle battery. In other scenarios, the cooling elements may be used to cool the fuel vapor canister in anticipation of a refueling event, as shown in FIGS. 5 and 8. During a vehicle-off condition where the fuel vapor canister is being actively cooled, the change in canister temperature may be advantageously used to perform a leak test on the evaporative emissions system, as shown in FIGS. 6 and 9. In this way, bleed emissions may be reduced, and evaporative emissions system integrity determined without draining the vehicle battery.

Figure 1:
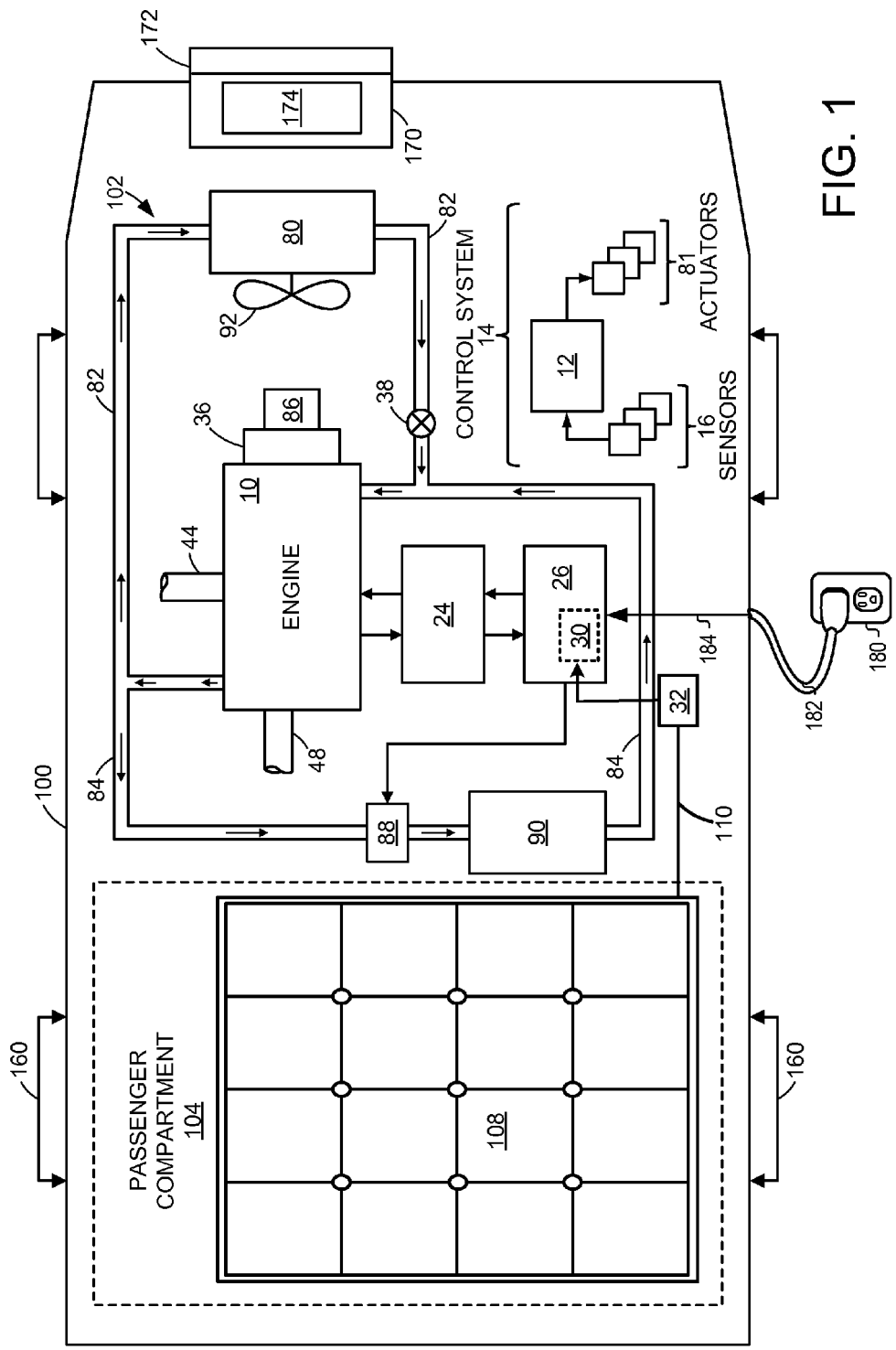
FIG. 1 shows a schematic depiction of a cooling system for a hybrid vehicle system.

Turning now to FIG. 1, an example embodiment of a motor vehicle system 100 comprising an internal combustion engine 10 and a cooling system 102 is illustrated schematically. Internal combustion engine 10 includes an intake 44 and an exhaust 48. Cooling system 102 circulates coolant through internal combustion engine 10 to absorb waste heat and distributes the heated coolant to radiator 80 and/or heater core 90 via coolant lines 82 and 84, respectively.

In particular, FIG. 1 shows cooling system 102 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 100 is moving slowly or stopped while the engine is running. In some examples, fan speed may be controlled by controller 12. Alternatively, fan 92 may be coupled to engine-driven water pump 86. One or more additional cooling fans may be coupled within the engine compartment, and configured to direct air at and/or through heat-generating elements within the engine compartment. For example, fan 92 and or one or more additional cooling fans may be situated as to direct air towards a fuel vapor canister in order to dissipate heat generated upon adsorption of fuel vapor, to cool the fuel vapor canister in anticipation of a refueling event, and/or to dissipate heat generated by thermo-electric elements coupled to the fuel vapor canister. Examples of such configurations are described further with reference to FIGS. 2 and 3.

After passing through engine 10, coolant may flow through coolant line 82, as described above, and/or through coolant line 84 to heater core 90 where the heat may be transferred to passenger compartment 104, and subsequently the coolant may flow back to engine 10. In some examples, engine-driven pump 86 may operate to circulate the coolant through both coolant lines 82 and 84. In examples where vehicle 100 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device (ESD) 26.

Motor vehicle 100 may further include a grill 172 providing an opening (e.g., a grill opening, a bumper opening, etc.) for receiving air flow through or near the front end of the vehicle and into the engine compartment. Such air flow may then be utilized by radiator 80 and other components to keep the engine and/or transmission cool. Further, the air flow may reject heat from the vehicle air conditioning and can improve performance of turbo charged/super charged engines that are equipped with intercoolers that reduce the temperature of the air that goes into the intake manifold/ engine. Other under hood components (fuel system, batteries, fuel vapor canister, etc.) may benefit from the cooling air flow as well. Thus, grill shutter system 170 may assist cooling system 102 in cooling internal combustion engine 10. Grill shutter system 170 comprises one or more grill shutters 174 configured to adjust the amount of air flow received through grill 172.

Grill shutters 174 are operable between an opened position and a closed position, and may be maintained at either position or a plurality of intermediate positions thereof. In other words, opening of grill shutters 174 may be adjusted such that grill shutters 174 are opened partially, closed partially, or cycled between an opened position and a closed position to provide air flow for cooling engine compartment components at the least loss in fuel economy. This is because closing and/or partially closing grill shutters 174 reduces an amount of air flow received through grill 172, thus reducing the aerodynamic drag on the vehicle.

In some embodiments, control system 14 may be configured to adjust opening of grill shutters 174. Adjusting opening of grill shutters 174 may include opening one or more of the grill shutters, closing one or more of the grill shutters, partially opening one or more of the grill shutters, partially closing one or more of the grill shutters, adjusting opening and closing timing, etc. As an example, controller 12 may be communicably connected to grill shutter system 170, and may have instructions stored thereon to adjust opening of grill shutters 174.

Further, grill shutter system 170 may be adjusted during a non-driven vehicle condition. Thus, adjusting opening of one or more of the grill shutters 174 can be in response to a non-driven vehicle condition. The non-driven vehicle condition may be a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used indicating a slower region ahead, a downgrade approaching, etc.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 160, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described further herein with reference to FIG. 2).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 160. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

Energy storage device 26 may periodically receive electrical energy from a power source 180 residing external to the vehicle (e.g. not part of the vehicle) as indicated by arrow 184. As a non-limiting example, vehicle system 100 may be configured as a plug-in hybrid electric vehicle (PHEV), whereby electrical energy may be supplied to energy storage device 26 from power source 180 via an electrical energy transmission cable 182. During a recharging operation of energy storage device 26 from power source 180, electrical transmission cable 182 may electrically couple energy storage device 26 and power source 180. While the vehicle propulsion system is operated to propel the vehicle, electrical transmission cable 182 may be disconnected between power source 180 and energy storage device 26. Control system 14 may identify and/or control the amount of electrical energy stored at the energy storage device, which may be referred to as the state of charge (SOC). Power source 180 may comprise a part of an electrical grid.

In other embodiments, electrical transmission cable 182 may be omitted, where electrical energy may be received wirelessly at energy storage device 26 from power source 180. For example, energy storage device 26 may receive electrical energy from power source 180 via one or more of electromagnetic induction, radio waves, and electromagnetic resonance. As such, it should be appreciated that any suitable approach may be used for recharging energy storage device 26 from a power source that does not comprise part of the vehicle. In this way, a motor may propel the vehicle by utilizing an energy source other than the fuel utilized by engine 10.

In some examples, vehicle system 100 may include one or more solar cells 108, operative to convert incident solar radiation into electrical energy. The solar cells 108 are electrically coupled to solar battery 30, via charge controller 32. Solar cells 108 and charge controller 32 are operative to supply electrical current for charging solar battery 30. In this example, solar battery 30 is housed within and electrically coupled to energy storage device 26, but in other configurations solar battery 30 may be electrically coupled to energy storage device 26 while being housed separately, or may be both physically and electrically isolated from energy storage device 26. Solar battery 30 may thus be configured to provide or receive charge from energy storage device 26, depending on engine operating conditions, charge status, and battery requirement(s).

Solar battery 30 may be configured to independently supply charge directly to vehicle actuators and devices, such as cooling fan 92, auxiliary pump 88, and grill shutter 174. Other actuators and devices that may be directly powered by solar battery 30 are discussed further herein and with regard to FIGS. 2 and 3. In some examples, charge controller 32 may be used to directly supply power to vehicle actuators and devices without requiring charge to first be stored in solar battery 30. By directly coupling solar cells 108 to vehicle devices and actuators via charge controller 32 and/or solar battery 30, vehicle devices and actuators related to climate and temperature control may be activated responsive to sun-loading on the solar cells. For example, passenger cabin air conditioning may be activated, vehicle windows may be vented, smart-windows may be tinted or otherwise configured to block UV, IR, and/or visible light, etc. As described further herein and with reference to FIGS. 3-9, a thermal management system for a fuel vapor canister may be activated responsive to sun loading in order to prevent bleed emissions when a vehicle is parked in the sun.

As shown in FIG. 1, the solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard, or other passenger compartment surface in proximity to a window or interior light bulb. In general, the solar cells are operative to convert solar radiation incident thereon into electrical energy. In some embodiments, solar cells 108 may comprise a series of photovoltaic cells, formed from an amorphous semi-conductor material, such as silicon. Additionally, individual photovoltaic cells may be interconnected so as to provide a constant flow of electrical energy to a common output cable 110, which electrically couples solar cells 108 to charge controller 32 and solar battery 30.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system, and may include components as described for vehicle system 100.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a refueling system 219. In some examples, refueling system may include a fuel cap 205 for sealing off the refueling system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Fuel vapor adsorbing to the canister adsorbent bed is typically an exothermic reaction (heat is released). Similarly, fuel vapor desorbing from the canister adsorbent bed is typically an endothermic reaction (heat is absorbed). As such, one or more temperature sensors 290 may be coupled to canister 222 (and/or buffer 222a). Temperature sensor 290 may be used, for example, to monitor the canister temperature during refueling operations, so as to infer canister load, and may be further used, for example, to monitor the canister temperature during purging operations, so as to infer fuel charge entering the engine intake. Further, canister 222 may be coupled to one or more thermo-electric elements 292. Thermo-electric element 292 may be used to selectively heat the canister (and the adsorbent contained within) for example, to increase desorption of fuel vapors prior to performing a purge operation. Thermo-electric element 292 may comprise a heating element such as a conductive metal, ceramic, or carbon element that may be heated electrically, such as a thermistor. Thermo-electric element 292 may further be used to selectively cool the canister (and the adsorbent contained within) for example, to prevent bleed emissions, or to increase the adsorption capacity of the canister prior to a refueling event. As described further herein and with reference to FIG. 3, canister 222 may be coupled to one or more Peltier elements, which may be used to selectively heat and cool the canister. In particular, the Peltier elements may be powered by solar panels or grid power, as shown in FIGS. 1 and 3. Other canister cooling elements may be coupled to the canister 222 in addition to or as an alternative to thermo-electric element 292, such as coolant circuits, refrigerant circuits, and/or other suitable cooling elements. Example methods for heating and cooling canister 222 are described herein and with regards to FIGS. 4-6.

Emissions control system 251 may further include a bleed canister 295. Hydrocarbons that desorb from canister 222 (hereinafter also referred to as the "main canister") over the course of one or more diurnal cycles may be adsorbed within the bleed canister. Vehicles classified as partial zero emissions vehicles (PZEVs) in North America are required to include a bleed canister. Bleed canister 295 may include an adsorbent material that is different than the adsorbent material included in main canister 222. As lighter hydrocarbons such as butanes and pentanes are more likely to desorb due to temperature increases, the bleed canister may be configured to preferentially adsorb these hydrocarbons at relatively low concentrations. Accordingly, the adsorbent within bleed canister 295 may be comprised of an activated carbon or other suitable scrubber element with a relatively high percentage of micropores compared to the adsorbent within main canister 222, such as activated carbon derived from coconut shells. The adsorbent may be molded into a honeycomb shape or other suitable flow path to increase the surface area available for adsorbance.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, canister vent valve 297 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Canister vent valve 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere. A vent line pressure transducer (VLPT) 232 may be disposed within vent line 227 between canister 222 and CVV 297.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include vent line pressure sensor 232, fuel tank pressure transducer (FTPT) 291, and canister temperature sensor 290. Other sensors such as exhaust oxygen sensor 233, exhaust temperature sensor 237, and other pressure, temperature, oxygen, hydrocarbon, air/fuel ratio, and composition sensors may be coupled to various locations in the vehicle system 206. As another example, the actuators may include thermo-electric element 292, cooling fan 92, canister vent valve 297, canister purge valve 261, and fuel tank isolation valve 252. The controller 212 may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive signals from the various sensors of FIGS. 1-2, process the signals, and trigger the various actuators of FIGS. 1-2 in response to the processed signals based on instruction or code programmed therein corresponding to one or more routines. Example control routines are described herein with regard to FIGS. 4-6.

Leak detection routines may be intermittently performed by controller 212 on fuel system 218 and emissions control system 251 to confirm that the systems are not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum.

FIG. 3 shows a detailed schematic diagram of an example fuel vapor canister 300. Canister 300 may comprise a load port 302 configured to couple the canister to a fuel tank via a conduit, such as conduit 278, as shown in FIG. 2. In some examples, load port 302 may be coupled to a canister buffer, such as canister buffer 222a, as shown in FIG. 2. Canister 300 may further comprise a fresh air port 303 that may be coupled to atmosphere via a canister vent line, such as vent line 227, as show in FIG. 2. Canister 300 may further include a purge output port 304 that may be coupled to an engine intake via a purge line, such as purge line 228, as shown in FIG. 2. Load port 302 may facilitate the flow of fuel vapor into canister 300 via load conduit 306. Load conduit 306 may extend into central cavity 307 of canister 300. Similarly, canister fresh air port 303 may be configured to couple the fresh air side of the fuel vapor canister to atmosphere via a canister vent line, and thus may facilitate the flow of fresh air into, and gasses stripped of fuel vapor out of canister 300 via fresh air conduit 308. Fresh air conduit 308 may extend into central cavity 307 of canister 300. Purge conduit 309 may extend into central cavity 307 and may facilitate the flow of fuel vapor out of canister 300 and into purge output port 304. In some examples, a partition 310 may extend between fresh air conduit 308 and conduits 306 and 309 to facilitate distribution of fuel vapor and fresh air throughout central cavity 307. Accordingly, canister 300 may be considered divided into a fresh air side 320 and a load side 322 though partition 310 may not completely isolate fresh air side 320 of canister 300 from load side 322. As such, load port 302 and purge output port 304 may be coupled to load side 322, while fresh air port 303 may be coupled to fresh air side 320.

Canister 300 may be filled with an adsorbent material 312. Central cavity 307 and adsorbent material 312 may thus comprise an adsorbent bed. The adsorbent bed may be partitioned into a load side and a fresh air side by partition 310. Adsorbent material 312 may comprise any suitable material for temporarily trapping fuel vapors (including vaporized hydrocarbons) generated during fuel tank refueling operations, as well as diurnal vapors. In one example, adsorbent material 312 is activated charcoal. Fuel vapor entering central cavity 307 via load conduit 306 may bind to adsorbent material, while gasses stripped of fuel vapor may then exit canister 300 via fresh air conduit 308. Conversely, during a purge operation, fresh air may enter central cavity 307 via fresh air conduit 308, while desorbed fuel vapor may then exit canister 300 via purge conduit 309.

During canister loading, such as during a refueling event, fuel vapor adsorbing to the adsorbent material 312 is an exothermic reaction. In particular, the adsorbent material in the region of central cavity 307 that surrounds load conduit 306 will experience an increased temperature during a majority of canister loading events. Similarly, during canister purging, fuel vapor desorbing from the adsorbent material 312 is an endothermic reaction. In particular, the adsorbent material in the region of central cavity 307 that surrounds purge conduit 309 will experience a decreased temperature during a majority of canister purging events.

Canister 300 may be coupled to a canister temperature management system 301. Canister temperature management system 301 may include one or more heating and one or more cooling mechanisms. For example, canister temperature management system 301 may include one or more thermo-electric devices. In this example, Peltier elements (314a and 314b) are coupled within central cavity 307, and may be operable to selectively heat or cool the canister adsorbent bed. Each Peltier element has two sides. For clarity, only the side internal to the canister is shown in FIG. 3. When DC current flows through a Peltier element, it brings heat from a first side to a second, opposite side. In a first conformation, heat may be drawn from the side on the interior of the canister towards the exterior side, releasing heat at heat sink 332, thus cooling the interior of the canister. Alternatively, if the charge polarity of the Peltier element is reversed, the thermoelectric generator may operate in the other direction, drawing heat from the exterior of the canister, thus warming the interior of the canister. DC current 316 may be provided by a rechargeable battery 328. Rechargeable battery 328 may be supplied by charge controller 326, which may be configured to receive power from the solar cells 324. In other words, one or more solar cells may be configured to provide power to the one or more Peltier elements. In some examples, charge controller 326 may be used to directly supply power to external devices, such as Peltier elements 314a and 314b.

Peltier elements 314a are shown positioned within canister 300 on canister load side 322, while Peltier elements 314b are shown positioned in canister 300 on the fresh air side 320. As such, Peltier elements 314a and 314b may be differentially regulated, as discussed herein and with respect to methods described in FIG. 5. For example, in a first condition Peltier elements 314a may be activated, while Peltier elements 314b remain off, and, in a second condition, Peltier elements 314a and 314b may both be activated. In most scenarios, all active Peltier elements will be activated with the same polarity (e.g., all elements heating or cooling the interior of the canister). However, in some scenarios one or more Peltier elements may act to cool the surrounding region of the canister, while one or more Peltier elements may act to heat the surrounding region of the canister. While two Peltier elements are shown within each of load side 322 and fresh air side 320, more or fewer elements may be included on each side, and the elements may be distributed unevenly throughout central cavity 307. In other words, one or more cooling elements may be coupled within the adsorbent bed on the load side of the fuel vapor canister, and one or more cooling elements may be coupled within the adsorbent bed on the fresh air side of the fuel vapor canister.

Canister management system 301 may additionally include one or more cooling fans 330, configured to direct air towards the fuel vapor canister 300, under conditions wherein the Peltier elements 314a and 314b are operating in cooling mode. In such a conformation, heat is generated external to the canister, and may be dissipated by directing air towards the canister via cooling fan 330. Power to the cooling fan 330 may be provided by rechargeable battery 328. In some examples, power to the cooling fan 330 may be provided directly via charge controller 326. In some examples, a cooling circuit may additionally or alternatively be coupled to the exterior of the canister. For example, a portion of an engine coolant circuit, such as the engine coolant circuit shown in FIG. 1 may flow coolant across the exterior of the canister thus dissipating heat generated while cooling the canister interior with Peltier elements 314a and 314b.

Canister management system 301 may additionally include one or more temperature sensors 318, positioned within central cavity 307 of canister 300. Temperature sensors 318 may be thermistors, for example. Accordingly, the temperature of the adsorbent material 312 may be indicated by temperature sensors 318. Power to the temperature sensors 318 may be provided by rechargeable battery 328, and/or the primary vehicle energy storage device. In some examples power to the temperature sensors may be provided directly via charge controller 326.

A controller, such as controller 212 in FIG. 2, may be configured to receive and process signals from components of the canister temperature management system 301, such as temperature sensors 318. The controller may additionally trigger the actuator components of canister management system 301, for example the Peltier elements 314a and 314b as well as cooling fan 330, in response to processed signals based on instruction or code programmed therein corresponding to one or more routines, such as the routines described further herein with reference to FIGS. 4-6.

A flow chart for a high-level example method 400 for a canister temperature management strategy is shown in FIG. 4. More specifically, method 400 may be used to reduce bleed emissions by selectively cooling a fuel vapor canister following a vehicle-off condition. Method 400 will be described with reference to the systems described herein and shown in FIGS. 1-3, though it should be understood that similar methods may be applied to other systems without departing from the scope of this disclosure. Method 400 may be carried out by a controller, such as controller 212, and may be stored at the controller as executable instructions in non-transitory memory. Briefly, method 400 includes, during a first condition, including a vehicle-off condition and a vehicle sun exposure greater than a threshold, activating one or more cooling elements coupled to a fuel vapor canister, and activating one or more cooling fans to dissipate heat generated by the one or more cooling elements.

Method 400 begins at 405 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 410, method 400 includes indicating whether a vehicle-off condition is detected. A vehicle-off condition may be indicated by a key-off event, a user setting a vehicle alarm following exiting a vehicle that has been parked, or other suitable indicator. If a vehicle-off condition is not detected, method 400 proceeds to 415. At 415, method 400 includes maintaining a current canister temperature management strategy. For example, heating elements and/or cooling elements coupled within or adjacent to the fuel vapor canister may be maintained in their current status. Method 400 may then end.

If a vehicle-off condition is detected at 410, method 400 proceeds to 420, where an ambient temperature is determined and compared to a threshold temperature value. The ambient temperature measurement may be estimated, inferred, measured via an ambient temperature sensor, retrieved from an off-board weather server, etc. The threshold temperature may be based on one of at least a fuel level, a fuel type, a fuel Reid vapor pressure, and/or a canister load. If the ambient temperature is determined not to be above the threshold value, (e.g., the ambient temperature is below a threshold), method 400 proceeds to 425, and includes monitoring operating conditions during the vehicle-off condition. Monitoring operating conditions at may include, for example, monitoring ambient air temperature while the vehicle is off, and may further include indicating a condition wherein ambient temperature has risen above a threshold value during the vehicle off condition. Operating conditions may be monitored continuously, at pre-determined intervals, or at intervals based on current operating conditions, such as time of day. In some examples, the vehicle controller may be placed in a sleep mode, and re-awoken periodically to evaluate operating conditions. In some examples, one or more sensors, such as an ambient temperature sensor, may be operated as part of a hot-at-all-times (HAAT) circuit coupled to a wake-input of the controller, so that threshold changes in ambient temperature cause the controller to be re-awoken. In some examples, componentry related to method 400 may be electrically coupled to one or more solar cells attached to the vehicle, so that those components may be powered during the vehicle-off condition without draining the primary vehicle battery.

If the ambient temperature is indicated to be above the threshold value, method 400 proceeds to 430. At 430, method 400 includes assessing a bulk fuel temperature, and comparing the bulk fuel temperature with the ambient temperature. The bulk fuel temperature may be indicated based on a fuel temperature sensor(s) located in the fuel tank, estimated based on fuel tank pressure, or inferred based on other operating conditions. The bulk fuel temperature may be compared to the ambient temperature to determine whether the bulk fuel temperature is more than a threshold less than ambient temperature (e.g., likely to warm and volatize during the vehicle-off condition. In other words, it may be determined whether a bulk fuel temperature is greater than a threshold below an ambient temperature. The threshold value may be based on one or more of a fuel type, fuel boiling temperature, canister load, fuel tank pressure, etc.

If the bulk fuel temperature is within a threshold of the ambient temperature, method 400 proceeds to 425, and includes monitoring operating conditions during the vehicle-off condition. For example, bulk fuel temperature may be monitored while the vehicle is off, and may further be compared to ambient temperature during the vehicle-off condition. In some examples, a condition wherein the bulk fuel temperature has changed such that bulk fuel temperature is less than an ambient temperature by more than a threshold value may be indicated, may prompt a controller to be activated and may further result in the initiation of method 400.

If the bulk fuel temperature is indicated to be less than the ambient temperature by a threshold, method 400 proceeds to 435 where it is determined whether sun exposure on the vehicle is greater than a threshold amount. Vehicle sun exposure may be based on a load of one or more solar cells coupled to the vehicle, and the threshold amount may include for example, a percentage value of sun loading on the one or more solar cells, such as 70% sun loading. The threshold value may be predetermined, or based on operating conditions. For example, the sun loading threshold may be indicative of a condition wherein a bulk fuel temperature may increase by a threshold over time due to the sun exposure, thus generating fuel vapor. If a vehicle sun exposure is less than a threshold amount, method 400 proceeds to 425, and includes monitoring operating conditions during the vehicle-off condition. For example, vehicle sun exposure may be monitored while the vehicle is off. In some examples, method 400 may include indicating a condition wherein the sun exposure on the vehicle has increased such that exposure is above a threshold amount.

If the sun exposure on the vehicle is determined to be greater than the threshold amount, method 400 proceeds to 440. At 440, method 400 includes activating the one or more cooling elements. The canister cooling elements may include thermo-electric devices such as Peltier elements, coolant circuits, refrigerant circuits, and/or other suitable cooling elements. The one or more cooling elements may be powered via one or more solar cells (e.g., solar cells 324 shown in FIG. 3), on-board energy storage devices, and/or off-board energy storage devices (such as a power grid if the vehicle is plugged in for recharging). For example, as described with reference to FIG. 3, the cooling elements 314a and 314b coupled within the adsorbent bed 312 of the fuel vapor canister 300 may be powered via one or more solar cells 324 coupled to the vehicle. During some conditions such as those noted herein, the listed devices may be exclusively powered by the solar cells and not by any other electrical power source.

Continuing at 445, method 400 includes the activation of one or more cooling fans, such as cooling fan 330 shown in FIG. 3, for example, in response to determining that canister cooling elements have been activated. The one or more cooling fans may be powered via the one or more solar cells. The cooling fans may be configured to direct air towards the fuel vapor canister such that heat generated from the canister cooling element(s) is dissipated. For example, Peltier elements operating to cool the interior of the fuel vapor canister may provide heat to a heat-sink located externally to the fuel vapor canister. As per the cooling elements, the cooling fans may be powered via solar cells, on-board energy storage devices, and/or off-board energy storage devices. The speed of the cooling fans may be predetermined, or may be based on operating conditions. In some examples, vehicle grill shutters, such as grill shutters 174 shown in FIG. 1 may be opened to allow the cooling fans to circulate atmospheric air.

Continuing at 450, method 400 includes determining whether the canister temperature is below a threshold value. The threshold value may be predetermined, or may be based on operating conditions, such as the canister load, ambient temperature, expected fuel vapor, etc. If it is determined that the canister temperature is not less than the threshold temperature, the method proceeds to 455, wherein the method includes maintaining cooling elements and fans on while the canister temperature is above the threshold.

Alternatively, if the determined canister temperature is indicated to be less than the threshold temperature, method 400 proceeds to 460, and includes deactivating cooling elements and fans. In other words, the method includes deactivating the one or more cooling elements and the one or more cooling fans responsive to a canister temperature decreasing below a threshold. Following deactivation of cooling elements and fans, method 400 proceeds to 465, where the method includes updating a canister purge schedule responsive to the canister temperature decreasing below the threshold, and additionally includes updating a fuel tank venting schedule based on changes to the canister loading state and capacity resulting from canister cooling. Method 400 then proceeds to 425, and includes monitoring operating conditions for the duration of the vehicle-off condition. Method 400 may then end.

A flow chart for a high level example method 500 for improving canister adsorption is shown in FIG. 5. More specifically, method 500 may be used to reduce bleed emissions by selectively cooling a fuel vapor canister in reference to an anticipated or actual refueling event. Method 500 will be described with reference to the systems described herein and shown in FIGS. 1-3, though it should be understood that similar methods may be applied to other systems without departing from the scope of this disclosure. Method 500 may be carried out by a controller holding executable instructions in non-transitory memory, such as controller 212.

Method 500 begins at 505, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 includes indicating whether a refueling event is requested. For example, a refueling request may comprise a vehicle operator depression of a refueling button on a vehicle instrument panel in the vehicle, or at a refueling door. In some examples, a refueling request may comprise a refueling operator requesting access to fuel filler neck 211, for example, by attempting to open a refueling door, and/or attempting to remove a gas cap.

If a request for refueling is not indicated at 510, method 500 proceeds to 515. At 515, the method includes indicating whether a refueling event is anticipated. In some examples, a refueling event may be anticipated by detecting the proximity of the vehicle to a refueling station, for example, via an on-board GPS, or via wireless communication between the vehicle and a refueling pump. Conditions for an anticipated refueling event may additionally include a fuel level below a defined threshold value. For example, the threshold value may be based on an estimated number of miles the vehicle may drive based on the fuel level and engine operating conditions (e.g., "miles-to-empty" below a threshold). Conditions for an anticipated refueling event may further include a vehicle speed below a defined threshold value. The threshold value may be a value indicative that the vehicle is likely to come to a stop within a threshold duration, for example a duration necessary to cool the vapor canister to a predetermined temperature. If an anticipated refueling event is not indicated, method 500 proceeds to 520, and includes maintaining the current canister temperature management strategy. For example, heating elements and/or cooling elements coupled within or adjacent to the fuel vapor canister may be maintained in their current status. Method 500 may then end.

In response to a refueling event requested at 510, or alternatively if a refueling event is anticipated at 515, method 500 proceeds to 525 wherein method 500 includes activating one or more cooling elements coupled within an adsorbent bed on the load side of the fuel vapor canister, such as Peltier elements 314a as described with reference to FIG. 3. The canister cooling elements may include thermo-electric devices such as Peltier elements, coolant circuits, refrigerant circuits, and/or other suitable cooling elements. The cooling elements may be powered via solar cells, on-board energy storage devices, and/or off-board energy storage devices (such as a power grid if the vehicle is plugged in for recharging at the same time as it is being refueled). The load side of the canister may thus comprise the side of the canister connected via a conduit to the fuel tank via a load port. As such, in one example, load side Peltier elements 314a may be activated in a cooling conformation, while fresh air side Peltier elements 314b may be maintained off. In other examples, both load side and fresh air side cooling elements may be activated simultaneously. By activating the load side cooling elements, fuel vapor vented from the fuel tank during a fuel tank depressurization event may be adsorbed at the load side of the fuel vapor canister with an increased efficiency.

Continuing at 530, the activation of canister cooling elements is followed by the activation of one or more cooling fans, such as cooling fan 330 shown in FIG. 3. The cooling fans may be configured to direct air towards the fuel vapor canister such that heat generated from the canister cooling element(s) is dissipated. For example, Peltier elements operating to decrease the temperature of the interior of the fuel vapor canister may provide heat to a heat-sink located externally to the fuel vapor canister. As per the Peltier elements, the cooling fans may be powered via solar cells, on-board energy storage devices, and/or off-board energy storage devices. The speed of the cooling fans may be predetermined, or may be based on operating conditions. In some examples, vehicle grill shutters, such as grill shutters 174 shown in FIG. 1 may be opened to allow the cooling fans to circulate atmospheric air.

Continuing at 535, method 500 includes determining whether a refueling event has been initiated. Indication of the initiation of a refueling event may include the detection of a fuel dispensary nozzle inserted into the fuel tank neck, an increase in fuel level indicated by a fuel level indicator, a fuel tank temperature change, fuel tank pressure increase, etc. If a refueling event is not indicated, method 500 proceeds to 520, wherein method 500 includes maintaining the current canister temperature management strategy. For example, the load side Peltier elements may be maintained on, while the fresh-air side Peltier elements may be maintained off. Method 500 may then end.

If the initiation of a refueling event is indicated, method 500 proceeds to 540, wherein the entirety of canister cooling elements is activated. In other words, responsive to an initiation of a refueling event, the controller may activate the one or more cooling elements coupled within the adsorbent bed on the fresh air side of the fuel vapor canister, such as Peltier elements 314b as indicated in FIG. 3. Again, the canister cooling elements may include thermo-electric devices such as Peltier elements, coolant circuits, refrigerant circuits, and/or other suitable cooling elements. The cooling elements may be powered via solar cells, on-board energy storage devices, and/or off-board energy storage devices (such as a power grid if the vehicle is plugged in for recharging. By activating all of the canister cooling elements, fuel vapor generated during the refueling event may be adsorbed within the fuel vapor canister with an increased efficiency.

Following the activation of all canister cooling elements, method 500 proceeds to 545 and includes maintaining the one or more cooling elements coupled within the adsorbent bed on the fresh air side of the fuel vapor canister, the one or more cooling elements coupled within the adsorbent bed on the load side of the fuel vapor canister, and the one or more cooling fans on for the duration of the refueling event. Conclusion of the refueling event may include a stabilization of fuel level as monitored by a fuel level indicator, stabilization of fuel tank temperature and/or pressure, removal of the fuel dispensary nozzle from the fuel tank neck, etc. Additionally, conclusion of a refueling event may include a defined time interval following a stabilization of fuel level as monitored by a fuel level indicator, stabilization of fuel tank temperature and/or pressure, removal of the fuel dispensary nozzle from the fuel tank neck, etc., such that canister cooling elements remain on for a defined time following a refueling event to adsorb additional fuel vapor circulating through the fuel vapor canister.

Following the conclusion of the refueling event, method 500 proceeds to 550, wherein method 500 includes deactivating the one or more cooling fans and all of the cooling elements coupled within the fuel vapor canister. Continuing at 555, method 500 includes updating the canister purge schedule in accordance with the refueling event and may further include updating a canister loading state. A canister loading state may be determined based on hydrocarbon sensors, and/or temperature sensors positioned within the vapor canister, fuel tank pressure during the refueling event, etc. Method 500 may then end.

Turning to FIG. 6, a flow chart for a high level example method 600 for an opportunistic leak test is shown. More specifically, method 600 may be used to increase the likelihood that a canister leak test may be timely executed, by selectively performing a leak test under conditions where the vapor canister cooling is activated. In this way, the implementation of method 600 may save battery power and result in a reduction in bleed emissions. Method 600 will be described with reference to the systems described herein and shown in FIGS. 1-3, though it should be understood that similar methods may be applied to other systems without departing from the scope of this disclosure. Method 600 may be carried out by a controller, such as controller 212, and may be stored at the controller as executable instructions in non-transitory memory.

Method 600 begins at 605, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 610, method 600 includes determining whether a vehicle-off event is detected. A vehicle-off condition may be indicated by a key-off event, a user setting a vehicle alarm following exiting a vehicle that has been parked, or other suitable indicator. If a vehicle-off event is not detected, method 600 proceeds to 615. At 615, method 600 includes maintaining the current evaporative emissions system status. For example, a canister vent valve (CVV), fuel tank isolation valve (FTIV), ELCM pump, canister purge valve (CPV), heating and/or cooling elements coupled within or adjacent to the fuel vapor canister, etc., may be maintained in their current status. Method 600 may then end.

If a vehicle-off event is detected at 610, method 600 proceeds to 620 and includes determining whether canister cooling is active. For example, the status of canister cooling elements, such as Peltier elements, cooling fans, coolant circuits, etc. may be assessed. As shown in detail in FIG. 4, canister cooling may be activated in response to, for example, ambient temperature being greater than a threshold value, fuel temperature being below ambient temperature by a threshold amount, and sun exposure on the vehicle being greater than a threshold value. If canister cooling is not active, method 600 proceeds to 615, wherein the current evaporative emissions system status is maintained. Method 600 may then end.

If canister cooling is indicated at 620, method 600 proceeds to 625. At 625, method 600 includes, responsive to activating the one or more cooling elements, determining whether entry conditions are met for a leak test for an evaporative emissions system comprising the fuel vapor canister. Entry conditions may be based on one or more of ambient temperature, fuel level, fuel temperature, canister temperature, summed MAF, fuel tank pressure, miles driven in previous drive cycle, elapsed duration since previous leak test, etc. If entry conditions are not met, method 600 proceeds to 615, wherein the current evaporative emissions system status is maintained. Method 600 may then end.

Responsive to entry conditions being met for an evaporative emissions leak test, method 600 proceeds to 630 and includes isolating the fuel vapor canister, such as fuel vapor canister 222 shown in FIG. 2. Isolation of the fuel canister may comprise, in reference to FIG. 2, closing a canister vent valve 297 coupled within the canister vent line 227 between the fuel vapor canister 222 and atmosphere, closing a fuel tank isolation valve 252 coupled between a fuel tank 220 and the fuel vapor canister, and closing a canister purge valve 261. Continuing at 635, method 600 includes monitoring canister vent line pressure and fuel tank pressure for a duration. The monitoring duration may comprise a predetermined time interval required to pressurize or evacuate a canister vent line or fuel tank to a predetermined threshold value, and may vary depending on fuel level, fuel tank temperature and/or pressure, ambient temperature, etc. Canister vent line pressure may be indicated, for example, by a pressure sensor positioned in the vent line between the canister and the CVV, such as VLPT 232 as shown in FIG. 2, while fuel tank pressure may be indicated, for example, by a pressure sensor positioned within the fuel tank, or between the fuel tank and the FTIV or VBV, such as FTPT 291, as shown in FIG. 2.

Continuing at 640, method 600 includes determining whether canister vent line pressure is below a threshold. The threshold may be defined by, for example, a reference pressure obtained under control conditions in which leak orifice size is known. As the sealed canister cools, the vent line pressure should decrease at a predictable rate if no degradation is present. In other words, indicating degradation of the fuel vapor canister side of the evaporative emissions system may be based on a pressure in a canister vent line. In some examples, the threshold pressure may be a threshold rate of pressure change. If the canister vent line pressure is not below the predetermined threshold value, method 600 proceeds to 645, wherein canister side degradation is indicated. Indicating canister side degradation may include setting a flag at the controller and activating an MIL to indicate the vehicle operator of the presence of canister-side degradation. Once canister side degradation is indicated, method 600 proceeds to 650. At 650, method 600 may include adjusting evaporative emission system operating parameters. For example, method 600 may include adjusting a fuel tank venting parameter responsive to an indication of degradation of the fuel vapor canister side of the evaporative emission system. Further, a canister vent valve may be maintained closed during some conditions, a canister purge schedule may be updated, and an evaporative emissions leak test schedule may be updated.

If it is determined that canister vent line pressure is below a threshold at 640, the method proceeds to 655 where it is indicated that the canister side is intact (i.e. no leak). The passing test result may be recorded at the controller, and an evaporative emissions leak test schedule updated accordingly. Once the canister integrity has been determined, and appropriate system updates and adjustments have been made, method 600 proceeds to 660. At 660, method 600 includes indicating whether the absolute fuel tank pressure is greater than a threshold value. The threshold value may be defined, for example, by a reference pressure obtained under control conditions in which leak orifice size is known. As the fuel tank is not subject to cooling from the canister cooling elements, the fuel tank pressure may initially rise following sealing of the fuel tank as heat is rejected from the engine to the fuel tank. The fuel tank pressure threshold may thus include a positive pressure threshold. In some scenarios, the fuel tank will not reach the pressure threshold, and a vacuum may develop within the fuel tank as the fuel there within cools. The fuel tank pressure threshold may thus also include a vacuum threshold. If the absolute fuel tank pressure value is not indicated to be above a threshold value at 660, method 600 proceeds to 665, and includes indicating fuel tank degradation. In other words, method 600 comprises indicating degradation of the fuel tank responsive to an absolute fuel tank pressure less than a threshold. Indicating fuel tank degradation may include setting a flag at the controller and activating an MIL to indicate the vehicle operator of the presence of fuel tank degradation. Continuing at 670, method 600 includes adjusting engine operating parameters according to the indication that fuel tank degradation has occurred. Adjusting engine operating parameters may include adjusting a maximum engine load to reduce fuel consumption, adjusting a commanded A/F ratio, operating the vehicle in battery-only mode during certain conditions, etc. Following updating parameters at 670, method proceeds to 675 where the fuel vapor canister is unsealed. Method 600 may then end.

If however, at 660 it is indicated that the absolute fuel tank pressure is greater than the threshold value, method 600 proceeds to 680. At 680, method 600 includes indicating that the fuel tank is intact. Indicating that the fuel tank is intact may include recording the successful outcome of the leak test at the controller. Method 600 then proceeds to 685. At 685, method 600 includes updating the evaporative emissions leak test schedule. For example, scheduled leak tests may be delayed or adjusted based on the passing test result. Method 600 then proceeds to 675, and includes unsealing the fuel vapor canister. Method 600 may then end.

FIG. 7 shows an example timeline 700 for a canister temperature management strategy in an evaporative emissions system of a vehicle using the methods described herein and with reference to FIG. 4, as applied to the systems described herein and with reference to FIGS. 1-3. Timeline 700 includes plot 710, indicating whether a vehicle-off condition is detected over time. Timeline 700 further includes plot 720, indicating the ambient temperature over time. Line 725 indicates a threshold ambient temperature value indicative of conditions where canister cooling may be activated. Timeline 700 further includes plot 730, indicating a measured fuel temperature over time. Line 735 represents the ambient temperature over time as shown by plot 720. Line 737 indicates a fuel temperature threshold value, defined as a predetermined value below the measured ambient temperature. As described with regard to FIG. 4, a fuel temperature below the threshold is indicative of conditions where canister cooling may be activated. Timeline 700 further includes plot 740 indicating vehicle sun exposure as a percentage of solar cell loading over time. Line 745 indicates a threshold value for vehicle sun exposure above which is indicative of conditions where canister cooling may be activated, as described with regard to FIG. 4. Timeline 700 further includes plot 750, indicating the on or off status of cooling elements coupled to a fuel vapor canister as well as the status of cooling fan(s) directed at the fuel vapor canister. Cooling elements may include thermo-electric devices such as Peltier elements, coolant circuits, refrigerant circuits, and/or other suitable cooling elements, as described in regard to FIG. 4. Timeline 700 further includes plot 760, indicating a canister temperature over time. Line 765 indicates a threshold value for canister temperature, defined as a predetermined value below which bleed-through of hydrocarbon vapor through the canister is less likely.

At time $t_0$, the vehicle is in operation as indicated by plot 710. As such, the canister cooling elements and cooling fans are off, as indicated by plot 750. At time $t_1$, a vehicle-off event is detected. Ambient temperature, as indicated by plot 720, is above the threshold temperature, represented by line 725, and solar cell loading, as indicated by plot 740, is above the threshold solar cell loading represented by line 745. However, fuel temperature, as indicated by plot 730, is above the threshold fuel temperature, represented by line 737. As such, the canister cooling elements and cooling fans are maintained off.

Between time $t_1$ and time $t_2$, fuel temperature begins to decrease. At time $t_2$, fuel temperature decreases below the threshold value represented by line 737. Ambient temperature and solar cell loading remain above their respective thresholds. Accordingly, the canister cooling elements and cooling fans are activated at time $t_2$, in response to determining that fuel temperature is below a threshold value and ambient temperature and solar cell loading are above threshold values. From time $t_2$ to time $t_3$, the canister cooling elements and cooling fans are maintained on and thus the canister temperature decreases, as indicated by plot 760. At time $t_3$, the canister temperature reaches the canister temperature threshold, represented by line 765. Accordingly, the canister cooling elements and cooling fans are turned off.

At time $t_3$, the vehicle remains in a key off state. Ambient temperature remains relatively constant from time $t_3$ to time $t_4$, and remains above the ambient temperature threshold. Fuel temperature remains below the fuel temperature threshold from time $t_3$ to time $t_4$. However, solar cell loading decreased from time $t_2$ to time $t_3$, and fell below the solar cell loading threshold. Solar cell loading remains below the solar cell loading threshold from time $t_3$ to time $t_4$, and thus the canister cooling elements and cooling fans are maintained off.

At time $t_4$ a vehicle-on event is detected. From time $t_4$ to time $t_5$, ambient temperature decreases below the ambient temperature threshold value, fuel temperature increases above the fuel temperature threshold, and solar cell loading remains below the solar cell loading threshold. Accordingly, when a vehicle off condition is detected at time $t_5$, the canister cooling elements and cooling fans are maintained off.

Between time $t_5$ and time $t_6$ the vehicle remains in a key-off state. Ambient temperature gradually increases, and reaches the ambient temperature threshold at time $t_6$. Similarly, solar cell loading gradually increases, and reaches the solar cell loading threshold at time $t_6$. The fuel temperature decreases, yet remains above the fuel temperature threshold value from time $t_5$ to time $t_6$. Accordingly, the canister cooling elements and fans are maintained off.

From time $t_6$ to time $t_7$, the fuel temperature decreases slightly, while ambient temperature and solar cell loading continue to increase. As such, fuel temperature reaches the fuel temperature threshold at time $t_7$. Accordingly, the canister cooling elements and cooling fan are activated in response to determining that fuel temperature is below a threshold value and that ambient temperature and solar cell loading are above threshold values. From time $t_7$ to time $t_8$, the canister cooling elements and cooling fans are maintained on and thus the canister temperature decreases. At time $t_8$, the canister temperature reaches the canister temperature threshold. Accordingly, the canister cooling elements and cooling fans are turned off. Solar cell loading decreases below the solar cell loading threshold at time $t_8$, and thus the re-activation of the canister cooling elements and cooling fans is not indicated.

FIG. 8 shows an example timeline 800 for active vapor canister cooling in anticipation of a refueling event using the methods described herein and with reference to FIG. 5 and as applied to the systems described herein and with reference to FIGS. 1-3. Timeline 800 includes plot 805, indicating vehicle fuel level over time. Line 810 indicates a threshold fuel level; fuel levels below the threshold are indicative of conditions where a refueling event is likely, as described with regard to FIG. 5. Timeline 800 further includes plot 820, indicating a vehicle speed over time. Line 830 indicates a threshold vehicle speed; vehicle speeds below the threshold are indicative of conditions where a refueling event is likely, as described with regard to FIG. 5. Timeline 800 further includes plot 840, depicting whether a canister load side cooling element and cooling fans are in an on or off state over time; plot 850, indicating whether a refueling event is requested over time; and plot 860, indicating whether an refueling event is actively occurring over time. Timeline 800 further includes plot 870, indicating the on or off state of canister fresh air side cooling elements, as described with regard to FIG. 5.

At time $t_0$ the vehicle is in operation. As indicated by plot 805, the vehicle fuel level is below the threshold represented by line 810. However, as indicated by plot 820, the vehicle is moving above the threshold speed represented by line 830. As such, a refueling event is not anticipated. No refueling event has been requested, as indicated by plot 850. Accordingly, canister load side cooler and fans are in an off-state, as indicated by plot 840, and the canister fresh air side cooling elements are in an off-state, as indicated by plot 870.

At time $t_1$ the vehicle speed decreases below the threshold speed, while the fuel level remains below the threshold level. In response to determining that a refueling event is anticipated, the canister load side cooling elements and cooling fans are activated, as indicated by plot 840. A refueling event has not as yet been requested, and the vehicle is not in the active state of refueling as indicated by plot 860. Accordingly, the fresh-air side cooling elements are maintained in an off-state, as indicated by plot 870.

Between time $t_1$ and time $t_2$, the vehicle comes to a stop, as indicated by plot 820. At time $t_2$, a refueling event is requested, as indicated by plot 850, and at time $t_3$ a refueling event is initiated, as indicated by plot 860. In response to the initiation of a refueling event, the fresh-air side cooling elements are activated, as indicated by plot 870. Between time $t_3$ and time $t_4$, the fuel level increases during the refueling event. The canister load side cooling elements, cooling fans and the fresh-air side cooling elements all are maintained in an on-state. At time $t_4$, the refueling event is complete, indicated by plot 860. Accordingly, the canister load side cooling elements, cooling fans, and fresh-air side cooling elements are turned off.

At time $t_5$, the vehicle begins driving, and accordingly, vehicle speed increases, indicated by plot 820. At time $t_6$, the vehicle speed begins decreasing, and at time $t_7$ the vehicle speed, decreases below the threshold speed. However, the fuel level remains above the threshold level, represented by line 810. As such, a refueling event is not anticipated, and the canister load side cooling elements, cooling fans and the fresh-air side cooling elements all remain in an off-state.

At time $t_8$ the vehicle comes to a stop, as indicated by plot 820, and a refueling event is requested, as indicated by plot 850. In response to determining a request for refueling, canister load side cooling elements and fans are activated, as indicated by plot 840. The refueling event is initiated at time $t_9$. In response to determining the initiation of a refueling event, the fresh-air side cooling elements are activated, as indicated by plot 870. At time $t_{10}$ the refueling event is complete, as indicated by plot 860. Accordingly, the canister load side cooling elements, cooling fans, and fresh-air side cooling elements are turned off.

FIG. 9 shows an example timeline for an opportunistic evaporative emissions system leak diagnostic test during a condition where canister cooling is activated while the vehicle is in an off-state using the methods described herein and with reference to FIG. 6, and as applied to the system described herein with reference to FIGS. 1-3. Timeline 900 includes plot 910, indicating whether the vehicle is in an on-state or an off-state over time. Timeline 900 further includes plot 920, indicating whether evap leak test criteria have been met over time; and plot 930, indicating whether canister cooling is activated over time. Timeline 900 further includes plot 940, indicating the open or closed state of the canister vent valve (CVV) over time; and plot 950, indicating the open or closed state of the fuel tank isolation valve (FTIV) over time. Timeline 900 further includes plot 960, indicating a pressure in a fuel vapor canister vent line over time as seen by a vent line pressure transducer (VLPT). Line 965 indicates a threshold pressure value, indicative of an intact canister-side of the evaporative emissions system, as described with regard to FIG. 6. Timeline 900 further includes plot 970, indicating a fuel tank pressure over time as seen by a pressure sensor (FTPT), positioned between the fuel tank and the FTIV. Line 975 indicates a threshold (positive) pressure value, indicative of an intact fuel tank during the pressure rise portion of a leak test, as described in regard to FIG. 6. Line 977 indicates a threshold (vacuum) pressure value, indicative of an intact fuel tank during the vacuum portion of a leak test, as described in regard to FIG. 6. Timeline 900 further includes plot 980, indicating the presence or absence of canister side leak over time, and plot 990, indicating the presence or absence of a tank side leak over time.

At time $t_0$ the vehicle is in operation, as indicated by plot 910. Accordingly, canister cooling is off, as indicated by plot 930, the CVV is open, as indicated by plot 940, and the FTIV is closed, as indicated by plot 950. At time $t_1$ a vehicle-off event occurs. Accordingly, FTIV is opened. At time $t_2$ canister cooling is initiated, as indicated by plot 930.

At time $t_3$ it is determined that entry criteria for an evap leak test have been met, as indicated by plot 920. As such, the CVV, and FTIV, are commanded closed, thereby sealing the fuel vapor canister from atmosphere, and isolating the fuel tank. Heat rejected from the vehicle engine to the fuel tank causes the fuel tank pressure to increase initially after closing the FTIV. At time $t_4$, the fuel tank pressure reaches the threshold, represented by line 975. Accordingly, no tank side leak is indicated, as illustrated by plot 990.

At time $t_5$, canister side vacuum, as measured by the VLPT decreases to the threshold value represented by line 965. Accordingly, no canister side leak is indicated, as illustrated by plot 980. The CVV and FTIV are opened, and the canister vent line pressure and fuel tank pressure equilibrate to atmospheric pressure. However, the canister cooling remains active.

At time $t_6$, the vehicle is turned on. Accordingly, the canister cooling is turned off, and the FTIV is closed, while the CVV is maintained open. At time $t_7$, the vehicle is turned off. The FTIV is again opened, and the canister cooling is re-activated. At time $t_8$, entry criteria for an evaporative emissions system leak test are met. Accordingly, the CVV and FTIV are closed, the vent line pressure begins to decrease, and the fuel tank pressure begins to increase.

As the vehicle was only on briefly, little heat is rejected to the fuel tank from the engine. As such, the fuel tank pressure begins to decrease at time $t_9$. At time $t_{10}$, the fuel tank pressure decreases to the vacuum threshold indicated by line 977. Accordingly, no fuel tank side leak is indicated.

However, at time $t_{10}$, the vent line pressure has plateaued at a pressure greater than the threshold represented by line 965. Accordingly, a canister-side leak is indicated, as shown by plot 980. The CVV and FTIV are then opened, and the canister vent line pressure and fuel tank pressure equilibrate to atmospheric pressure.

The systems described herein and with regard to FIGS. 1-3, along with the methods described herein and with regard to FIGS. 4-6 may enable one or more systems and one or more methods. In one example, a method for a vehicle is presented. During a first condition, including a vehicle-off condition and a vehicle sun exposure greater than a threshold, the method comprises activating one or more cooling elements coupled to a fuel vapor canister, and activating one or more cooling fans to dissipate heat generated by the one or more cooling elements. In such a method, the first condition may additionally or alternatively include an ambient temperature greater than a threshold. In any of the preceding examples, the first condition may additionally or alternatively include a bulk fuel temperature that is below the ambient temperature by more than a threshold. In any of the preceding examples wherein the first condition includes a bulk fuel temperature that is below the ambient temperature by more than a threshold, the method may additionally or alternatively comprise: during a second condition, including a vehicle-off condition and one or more of: an ambient temperature below a threshold, a bulk fuel temperature greater than a threshold below an ambient temperature, and a vehicle sun exposure less than a threshold, monitoring operating conditions during the vehicle-off condition, and activating the one or more cooling elements and the one or more cooling fans responsive to the first condition being met. In any of the preceding examples, the method may additionally or alternatively comprise deactivating the one or more cooling elements and the one or more cooling fans responsive to a canister temperature decreasing below a threshold. In any of the preceding examples wherein the one or more cooling elements and the one or more cooling fans are deactivated responsive to a canister temperature decreasing below a threshold, the method may additionally or alternatively comprise updating a canister purge schedule responsive to the canister temperature decreasing below the threshold. In any of the preceding examples, the vehicle sun exposure may additionally or alternatively be based on a load of one or more solar cells coupled to the vehicle. In any of the preceding examples wherein the vehicle sun exposure is based on a load of one or more solar cells coupled to the vehicle, the one or more cooling elements and the one or more cooling fans may additionally or alternatively be powered via the one or more solar cells. In any of the preceding examples, during the first condition, the method may additionally or alternatively comprise determining whether entry conditions are met for a leak test for an evaporative emissions system comprising the fuel vapor canister responsive to activating the one or more cooling elements, isolating the fuel vapor canister responsive to entry conditions being met for the leak test, and indicating degradation of a fuel vapor canister side of the evaporative emissions system based on a pressure in a canister vent line. In any of the preceding examples where the fuel vapor canister is isolated responsive to entry conditions being met for a leak test, the method may additionally or alternatively comprise closing a canister vent valve coupled within the canister vent line between the fuel vapor canister and atmosphere, and closing a fuel tank isolation valve coupled between a fuel tank and the fuel vapor canister. In any of the preceding examples wherein a fuel tank isolation vale is closed, the method may additionally or alternatively comprise indicating degradation of the fuel tank responsive to an absolute fuel tank pressure less than a threshold. In any of the preceding examples wherein degradation of a fuel vapor canister side of the evaporative emissions system is indicated based on a pressure in a canister vent line, the method may additionally or alternatively comprise adjusting a fuel tank venting parameter responsive to an indication of degradation of the fuel vapor canister side of the evaporative emissions system. In any of the preceding examples, the one or more cooling elements may additionally or alternatively include one or more Peltier elements. The technical result of implementing this method is a reduction in vehicle bleed emissions. In examples where the canister cooling elements and canister cooling fans are powered by solar cells, bleed emissions may be reduced without draining the primary vehicle energy storage device. Further, the cooling of the canister during a vehicle-off condition allows for opportunistic leak testing of the evaporative emissions system. In this way, the evaporative emissions system may be monitored and regulated during conditions where bleed emissions are likely to occur.

In another example, an evaporative emissions system for a vehicle is presented. The evaporative emissions system comprises a fuel vapor canister comprising an adsorbent bed partitioned into a load side and a fresh air side, a load port configured to couple the load side to a fuel tank via a conduit, a fresh air port configured to couple the fresh air side of the fuel vapor canister to atmosphere via a canister vent line, and one or more cooling elements coupled within the adsorbent bed on the load side of the fuel vapor canister, and one or more cooling elements coupled within the adsorbent bed on the fresh air side of the fuel vapor canister. The evaporative emissions system further comprises one or more cooling fans configured to direct air towards the fuel vapor canister, and a controller holding executable instructions stored in non-transitory memory, that when executed, cause the controller to activate the one or more cooling elements coupled within the adsorbent bed on the load side of the fuel vapor canister responsive to a refueling request, and activate the one or more cooling fans to dissipate heat generated by the activated cooling elements. In such an example evaporative emissions system, the controller may additionally or alternatively hold executable instructions stored in non-transitory memory, that when executed, cause the controller to activate the one or more cooling elements coupled within the adsorbent bed on the fresh air side of the fuel vapor canister responsive to an initiation of a refueling event, maintain the one or more cooling elements coupled within the adsorbent bed on the fresh air side of the fuel vapor canister, the one or more cooling elements coupled within the adsorbent bed on the load side of the fuel vapor canister, and the one or more cooling fans on for the duration of the refueling event, and deactivate the one or more cooling fans and all of the cooling elements coupled within the fuel vapor canister following completion of the refueling event. In any of the preceding examples, the controller may additionally or alternatively hold executable instructions stored in non-transitory memory, that when executed, cause the controller to activate the one or more cooling elements coupled within the adsorbent bed on the load side of the fuel vapor canister responsive to a likelihood of a refueling event being greater than a threshold, and activate the one or more cooling fans to dissipate heat generated by the activated cooling elements. In any of the preceding examples, each of the cooling elements coupled within the adsorbent bed of the fuel vapor canister may additionally or alternatively comprise one or more Peltier elements. In any of the preceding examples, the cooling elements coupled within the adsorbent bed of the fuel vapor canister may additionally or alternatively be powered via one or more solar cells coupled to the vehicle. The technical result of implementing this evaporative emissions system is an increased adsorption of refueling vapors within the fuel vapor canister. The fuel vapor canister may be proactively cooled in anticipation of a refueling event, thus increasing the effective capacity of the adsorbent. In this way, refueling emissions may be reduced.

In yet another example, a vehicle system is provided, comprising a fuel vapor canister comprising an adsorbent bed, a load port, and a fresh air port, a fuel tank coupled to the fuel vapor canister at the load port via a fuel tank isolation valve deposed within a conduit, a canister vent line coupled to the fuel vapor canister at the fresh air port, a canister vent valve deposed within the canister vent line and configured to selectively couple the fresh air port to atmosphere, one or more Peltier elements coupled within an adsorbent bed of the fuel vapor canister, the one or more Peltier elements selectively operable to heat or cool the adsorbent bed, one or more cooling fans configured to direct air towards the fuel vapor canister, one or more solar cells configured to provide power to the one or more Peltier elements and the one or more cooling fans, and a controller holding executable instructions stored in non-transitory memory, that when executed, cause the controller to activate the one or more Peltier elements in a cooling configuration via power from the one or more solar cells during a first condition including a vehicle-off condition and a vehicle sun exposure greater than a threshold, activate the one or more cooling fans via power from the one or more solar cells to dissipate heat generated by the one or more Peltier elements responsive to activation of the one of more Peltier elements in a cooling configuration, determine whether entry conditions are met for a leak test for an evaporative emissions system comprising the fuel vapor canister during the first condition, and responsive to activation of one or more Peltier elements in a cooling configuration, close the fuel tank isolation valve and the canister vent valve responsive to entry conditions being met for the leak test, and indicate degradation of a fuel vapor canister side of the evaporative emissions system based on a pressure in the canister vent line. In such an example, the vehicle system may additionally or alternatively comprise a partition coupled within the adsorbent bed of the fuel vapor canister between the load port and the fresh air port, dividing the fuel vapor canister into a load side and a fresh air side such that one or more Peltier elements are coupled within the adsorbent bed on the load side of the fuel vapor canister and one or more Peltier elements coupled within the adsorbent bed on the fresh air side of the fuel vapor canister, and the controller may additionally or alternatively hold executable instructions stored in non-transitory memory, that when executed, cause the controller to activate the one or more Peltier elements coupled within the adsorbent bed on the load side of the fuel vapor canister in a cooling configuration, responsive to a refueling request during a second condition, activate the one or more cooling fans to dissipate heat generated by the activated Peltier elements, activate the one or more Peltier elements coupled within the adsorbent bed on the fresh air side of the fuel vapor canister in a cooling configuration responsive to initiation of a refueling event, maintain the one or more cooling elements coupled within the adsorbent bed on the fresh air side of the fuel vapor canister, the one or more cooling elements coupled within the adsorbent bed on the load side of the fuel vapor canister, and the one or more cooling fans on for the duration of the refueling event, and deactivate the one or more cooling fans and all of the Peltier elements coupled within the adsorbent bed of the fuel vapor canister following completion of the refueling event. The technical result of implementing this vehicle system is an overall reduction in vehicle emissions. By utilizing solar power to selectively cool a fuel vapor canister, the vehicle emissions may be reduced while maintaining vehicle battery charge, which in turn may reduce the need for engine combustion during subsequent vehicle operations.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An evaporative emissions system for a vehicle, comprising:
 a fuel vapor canister comprising:
  an adsorbent bed partitioned into a load side and a fresh air side;
  a load port configured to couple the load side to a fuel tank via a conduit;
  a fresh air port configured to couple the fresh air side of the fuel vapor canister to atmosphere via a canister vent line;

one or more cooling elements coupled within the adsorbent bed on the load side of the fuel vapor canister; and one or more cooling elements coupled within the adsorbent bed on the fresh air side of the fuel vapor canister;

one or more cooling fans configured to direct air towards the fuel vapor canister; and a controller holding executable instructions stored in non-transitory memory, that when executed, cause the controller to:

responsive to a refueling request, activate the one or more cooling elements coupled within the adsorbent bed on the load side of the fuel vapor canister; and activate the one or more cooling fans to dissipate heat generated by the activated cooling elements.

2. The evaporative emissions system of claim 1, where the controller further holds executable instructions stored in non-transitory memory, that when executed, cause the controller to:

responsive to an initiation of a refueling event, activate the one or more cooling elements coupled within the adsorbent bed on the fresh air side of the fuel vapor canister;

maintain the one or more cooling elements coupled within the adsorbent bed on the fresh air side of the fuel vapor canister, the one or more cooling elements coupled within the adsorbent bed on the load side of the fuel vapor canister, and the one or more cooling fans on for the duration of the refueling event; and deactivate the one or more cooling fans and all of the cooling elements coupled within the fuel vapor canister following completion of the refueling event.

3. The evaporative emissions system of claim 1, where the controller further holds executable instructions stored in non-transitory memory, that when executed, cause the controller to:

responsive to a likelihood of a refueling event being greater than a threshold, activate the one or more cooling elements coupled within the adsorbent bed on the load side of the fuel vapor canister; and activate the one or more cooling fans to dissipate heat generated by the activated cooling elements.

4. The evaporative emissions system of claim 1, wherein each of the cooling elements coupled within the adsorbent bed of the fuel vapor canister comprise one or more Peltier elements.

5. The evaporative emissions system of claim 1, wherein the cooling elements coupled within the adsorbent bed of the fuel vapor canister are powered via one or more solar cells coupled to the vehicle.

6. A vehicle system, comprising:

a fuel vapor canister comprising an adsorbent bed, a load port, and a fresh air port;

a fuel tank coupled to the fuel vapor canister at the load port via a fuel tank isolation valve deposed within a conduit;

a canister vent line coupled to the fuel vapor canister at the fresh air port;

a canister vent valve deposed within the canister vent line and configured to selectively couple the fresh air port to atmosphere;

one or more Peltier elements coupled within an adsorbent bed of the fuel vapor canister, the one or more Peltier elements selectively operable to heat or cool the adsorbent bed;

one or more cooling fans configured to direct air towards the fuel vapor canister;

one or more solar cells configured to provide power to the one or more Peltier elements and the one or more cooling fans; and a controller holding executable instructions stored in non-transitory memory, that when executed, cause the controller to:

during a first condition, including a vehicle-off condition and a vehicle sun exposure greater than a threshold, activate the one or more Peltier elements in a cooling configuration via power from the one or more solar cells;

responsive to activation of the one of more Peltier elements in a cooling configuration, activate the one or more cooling fans via power from the one or more solar cells to dissipate heat generated by the one or more Peltier elements;

during the first condition, and responsive to activation of one or more Peltier elements in a cooling configuration, determine whether entry conditions are met for a leak test for an evaporative emissions system comprising the fuel vapor canister;

responsive to entry conditions being met for the leak test, close the fuel tank isolation valve and the canister vent valve; and indicate degradation of a fuel vapor canister side of the evaporative emissions system based on a pressure in the canister vent line.

7. The vehicle system of claim 6, further comprising:

a partition coupled within the adsorbent bed of the fuel vapor canister between the load port and the fresh air port, dividing the fuel vapor canister into a load side and a fresh air side such that one or more Peltier elements are coupled within the adsorbent bed on the load side of the fuel vapor canister and one or more Peltier elements coupled within the adsorbent bed on the fresh air side of the fuel vapor canister; and wherein the controller further holds executable instructions stored in non-transitory memory, that when executed, cause the controller to:

during a second condition, responsive to a refueling request, activate the one or more Peltier elements coupled within the adsorbent bed on the load side of the fuel vapor canister in a cooling configuration;

activate the one or more cooling fans to dissipate heat generated by the activated Peltier elements;

responsive to initiation of a refueling event, activate the one or more Peltier elements coupled within the adsorbent bed on the fresh air side of the fuel vapor canister in a cooling configuration;

maintain the one or more cooling elements coupled within the adsorbent bed on the fresh air side of the fuel vapor canister, the one or more cooling elements coupled within the adsorbent bed on the load side of the fuel vapor canister, and the one or more cooling fans on for the duration of the refueling event; and deactivate the one or more cooling fans and all of the Peltier elements coupled within the adsorbent bed of the fuel vapor canister following completion of the refueling event.

8. A method for a vehicle, comprising:

during a first condition, including a vehicle-off condition and a vehicle sun exposure greater than a threshold, activating one or more cooling elements coupled to a fuel vapor canister; and activating a cooling fan to dissipate heat generated by the one or more cooling elements.

9. The method of claim 8, wherein the first condition further includes an ambient temperature greater than a threshold.

10. The method of claim 9, wherein the first condition further includes a bulk fuel temperature that is below the ambient temperature by more than a threshold, wherein activating the cooling fan includes activating one or more cooling fans.

11. The method of claim 10, further comprising:
during a second condition, different from and mutually exclusive of the first condition, including a vehicle-off condition and one or more of:
an ambient temperature below a threshold,
a bulk fuel temperature greater than a threshold below an ambient temperature, and
a vehicle sun exposure less than a threshold,
monitoring operating conditions during the vehicle-off condition; and
activating the one or more cooling elements and the one or more cooling fans responsive to the first condition being met.

12. The method of claim 8, further comprising:
deactivating the one or more cooling elements and the cooling fan responsive to a canister temperature decreasing below a threshold.

13. The method of claim 12, further comprising:
updating a canister purge schedule responsive to the canister temperature decreasing below the threshold.

14. The method of claim 8, wherein the vehicle sun exposure is based on a load of one or more solar cells coupled to the vehicle.

15. The method of claim 14, wherein the one or more cooling elements and the fan are powered via the one or more solar cells.

16. The method of claim 8, further comprising:
during the first condition, responsive to activating the one or more cooling elements, determining whether entry conditions are met for a leak test for an evaporative emissions system comprising the fuel vapor canister;
responsive to entry conditions being met for the leak test, isolating the fuel vapor canister; and
indicating degradation of a fuel vapor canister side of the evaporative emissions system based on a pressure in a canister vent line.

17. The method of claim 16, wherein isolating the fuel vapor canister comprises:
closing a canister vent valve coupled within the canister vent line between the fuel vapor canister and atmosphere; and
closing a fuel tank isolation valve coupled between a fuel tank and the fuel vapor canister.

18. The method of claim 17, further comprising:
indicating degradation of the fuel tank responsive to an absolute fuel tank pressure less than a threshold.

19. The method of claim 16, further comprising:
adjusting a fuel tank venting parameter responsive to an indication of degradation of the fuel vapor canister side of the evaporative emissions system.

20. The method of claim 8, wherein the one or more cooling elements include one or more Peltier elements.

* * * * *